(12) United States Patent
Teyeb et al.

(10) Patent No.: US 12,369,092 B2
(45) Date of Patent: Jul. 22, 2025

(54) CONDITIONAL CONFIGURATION IN A WIRELESS COMMUNICATION NETWORK

(71) Applicant: Telefonaktiebolaget LM Ericsson (publ), Stockholm (SE)

(72) Inventors: Oumer Teyeb, Montréal (CA); Icaro L. J. da Silva, Solna (SE); Mattias Bergström, Sollentuna (SE); Patrik Rugeland, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 512 days.

(21) Appl. No.: 17/627,869

(22) PCT Filed: Jul. 17, 2020

(86) PCT No.: PCT/SE2020/050740
§ 371 (c)(1),
(2) Date: Jan. 18, 2022

(87) PCT Pub. No.: WO2021/015659
PCT Pub. Date: Jan. 28, 2021

(65) Prior Publication Data
US 2022/0295366 A1    Sep. 15, 2022

Related U.S. Application Data

(60) Provisional application No. 62/876,369, filed on Jul. 19, 2019.

(51) Int. Cl.
*H04W 36/36* (2009.01)
*H04W 36/00* (2009.01)
*H04W 76/30* (2018.01)

(52) U.S. Cl.
CPC ..... *H04W 36/362* (2023.05); *H04W 36/0058* (2018.08); *H04W 36/0061* (2013.01);
(Continued)

(58) Field of Classification Search
CPC .......... H04W 36/00837; H04W 76/30; H04W 36/0069; H04W 36/0058; H04W 36/0061; H04W 36/362
See application file for complete search history.

(56) References Cited

U.S. PATENT DOCUMENTS

2019/0380081 A1* 12/2019 Chang ............... H04W 36/0072
2020/0154287 A1*  5/2020 Novlan ............. H04W 36/0069
(Continued)

FOREIGN PATENT DOCUMENTS

GB         2528913 A        2/2016
WO    WO-2018058513 A1 *   4/2018  .......... H04B 7/0695
(Continued)

OTHER PUBLICATIONS

3GPP, "3GPP TS 37.340 V15.6.0", 3rd Generation Partnership Project; Technical Specification Group Radio Access Network; Evolved Universal Terrestrial Radio Access (E-UTRA) and NR; Multi-connectivity; Stage 2 (Release 15), Jun. 2019, 1-69.
(Continued)

*Primary Examiner* — Yemane Mesfin
*Assistant Examiner* — Salma Ayad
(74) *Attorney, Agent, or Firm* — Murphy, Bilak & Homiller, PLLC

(57) ABSTRACT

A wireless device (16) receives a control message (26) that indicates a nested conditional configuration (28). The nested conditional configuration (28) includes an outer conditional configuration (28-1) and an inner conditional configuration (28-2). The wireless device (16) is to apply the outer conditional configuration (28-1) if the wireless device (16) detects fulfillment of an outer trigger condition. The wireless device (16) is to apply the inner conditional configuration (28-2) if the wireless device (16) detects fulfillment of both the outer trigger condition and an inner trigger condition.

19 Claims, 29 Drawing Sheets

(52) U.S. Cl.
CPC ..... *H04W 36/00692* (2023.05); *H04W 76/30* (2018.02); *H04W 36/00838* (2023.05)

(56) References Cited

U.S. PATENT DOCUMENTS

| | | | |
|---|---|---|---|
| 2020/0329415 A1* | 10/2020 | Li | H04W 36/304 |
| 2021/0360495 A1* | 11/2021 | Lovlekar | H04W 36/00837 |
| 2022/0256415 A1* | 8/2022 | Höhne | H04W 36/304 |

FOREIGN PATENT DOCUMENTS

| | | | |
|---|---|---|---|
| WO | 2018171634 A1 | | 9/2018 |
| WO | WO-2020164073 A1 | * | 8/2020 |
| WO | 2020197469 A1 | | 10/2020 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.6.0, Jun. 2019, 1-519.

Ericsson, "Conditional SCG Resume", 3GPP TSG-RAN WG2#106, R2-1907256, Reno, USA, May 13-17, 2019, 1-2.

Interdigital Inc., "Triggers for Conditional Handover in NR", 3GPP RAN WG2 Meeting #106, R2-1906395, (Revision of R2-1903560), Reno, United States, May 13-17, 2019, 1-4.

NTT DOCOMO, Inc., "Support of Conditional PSCell addition/change", 3GPP TSG-RAN WG2 Meeting #106, R2-1908016, Reno, USA, May 13-17, 2019, 1-3.

* cited by examiner

OPTION 1

OPTION 2

OPTION 3/3A/3X

OPTION 4/4A

OPTION 5

OPTION 7/7A

CONDITIONAL CONFIGURATION IN A WIRELESS COMMUNICATION NETWORK

TECHNICAL FIELD

The present application relates generally to a wireless communication network and relates more particularly to conditional configuration in such a network.

BACKGROUND

Robustness of mobility procedures to failure proves challenging particularly in New Radio (NR) systems whose radio links are more prone to fast fading due to their higher operating frequencies. Conditional mobility is one approach to improve mobility robustness in this regard. Under this approach, a wireless device may be commanded to perform a mobility procedure (e.g., handover or resume) earlier than traditionally commanded, before the source radio link quality deteriorates below a certain threshold. But the wireless device is commanded to wait to perform that mobility procedure until the wireless device detects that a certain condition is fulfilled, e.g., the source radio link quality deteriorates even further below a different threshold. Once the device detects that condition, the device may autonomously perform the mobility procedure without receiving any other signaling on the source radio link, so that the procedure proves robust to source link deterioration.

Although this conditional mobility approach can improve mobility robustness, the approach under some circumstances threatens to increase signaling overhead, delay mobility, and/or trigger unnecessary measurements. For example, this may be the case where the conditional configuration concerns multi-connectivity (e.g., dual connectivity).

SUMMARY

Some embodiments herein exploit a nested conditional configuration. The nested conditional configuration includes an outer conditional configuration that a wireless device is to apply if the wireless device detects fulfillment of an outer trigger condition. The nested conditional configuration also includes an inner conditional configuration that the wireless device is to apply if the wireless device detects fulfillment of both the outer trigger condition and an inner trigger condition. In some embodiments, the outer conditional configuration is to apply to a master radio network node or master cell group in multi-connectivity operation, and the inner conditional configuration is to apply to a secondary radio network node or secondary cell group in multi-connectivity operation.

In some embodiments, the wireless device monitors for or evaluates fulfillment of the inner trigger condition only after the outer trigger condition has been fulfilled. Alternatively or additionally, the wireless device may perform a measurement on which fulfillment of the inner trigger condition depends, only after the outer trigger condition has been fulfilled. The wireless device in these and other cases may thereby avoid processing complexity and/or measurements attributable to the inner conditional configuration, until needed.

Alternatively or additionally, the wireless device may apply both the outer conditional configuration and the inner conditional configuration responsive to fulfillment of both the outer trigger condition and the inner trigger condition. Accordingly, in some embodiments, application of both the outer and inner conditional configurations may be quickly performed via communication of a single control message, so as to reduce signaling overhead and delay.

In these and other cases, then, the nested nature of the conditional configuration may advantageously reduce signaling overhead, avoid delay mobility, and/or avoid unnecessary measurements.

More particularly, embodiments herein include a method performed by a wireless device. The method comprises receiving a control message that indicates a nested conditional configuration. The nested conditional configuration includes an outer conditional configuration that the wireless device is to apply if the wireless device detects fulfillment of an outer trigger condition. The nested conditional configuration also includes an inner conditional configuration that the wireless device is to apply if the wireless device detects fulfillment of both the outer trigger condition and an inner trigger condition.

In some embodiments, the outer conditional configuration is to apply to a master radio network node or master cell group in multi-connectivity operation. In one such embodiment, the inner conditional configuration is to apply to a secondary radio network node or secondary cell group in multi-connectivity operation.

In some embodiments, the outer conditional configuration is a conditional handover configuration for conditional handover to a master radio network node or master cell group in multi-connectivity operation. In one such embodiment, the inner conditional configuration is a conditional secondary configuration for conditionally adding or changing a secondary radio network node or a secondary cell group in multi-connectivity operation.

In some embodiments, the nested conditional configuration is a nested conditional handover configuration.

In some embodiments, the method further comprises monitoring for or evaluating fulfillment of the inner trigger condition only after the outer trigger condition has been fulfilled.

In some embodiments, the method further comprises performing a measurement on which fulfillment of the inner trigger condition depends, only after the outer trigger condition has been fulfilled.

In some embodiments, the method further comprises applying both the outer conditional configuration and the inner conditional configuration responsive to fulfillment of both the outer trigger condition and the inner trigger condition.

In some embodiments, the method further comprises, after applying both the outer conditional configuration and the inner conditional configuration, transmitting a nested control message that indicates the wireless device applied the outer conditional configuration and that includes an embedded control message that indicates the wireless device applied the inner conditional configuration.

In some embodiments, the method further comprises applying only the outer conditional configuration, not the inner conditional configuration, responsive to expiration of a time limit for the inner trigger condition to be fulfilled after the outer trigger condition has been fulfilled. In one such embodiment, the method further comprises receiving signalling indicating the time limit.

Embodiments herein also include a method performed by a radio network node. The method comprises transmitting, to a wireless device, a control message that indicates a nested conditional configuration. The nested conditional configuration includes an outer conditional configuration that the wireless device is to apply if the wireless device detects fulfillment of an outer trigger condition. The nested conditional configuration also includes an inner conditional configuration that the wireless device is to apply if the wireless device detects fulfillment of both the outer trigger condition and an inner trigger condition.

In some embodiments, the outer conditional configuration is to apply to a master radio network node or master cell group in multi-connectivity operation. In one such embodiment, the inner conditional configuration is to apply to a secondary radio network node or secondary cell group in multi-connectivity operation.

In some embodiments, the outer conditional configuration is a conditional handover configuration for conditional handover to a master radio network node or master cell group in multi-connectivity operation. In one such embodiment, the inner conditional configuration is a conditional secondary configuration for conditionally adding or changing a secondary radio network node or a secondary cell group in multi-connectivity operation.

In some embodiments, the method further comprises transmitting, to the wireless device, signalling indicating a time limit for the inner trigger condition to be fulfilled after the outer trigger condition has been fulfilled.

In some embodiments, the method further comprises receiving a control message that indicates the wireless device applied the outer conditional configuration.

In some embodiments, the method further comprises, responsive to receiving the control message, transmitting control signaling to one or more other radio network nodes indicating that any other outer conditional configuration for the wireless device is to be released.

In some embodiments, the method further comprises receiving a nested control message that indicates the wireless device applied the outer conditional configuration and that includes an embedded control message that indicates the wireless device applied the inner conditional configuration.

In some embodiments, the nested conditional configuration is a nested conditional handover configuration. In one such embodiment, the radio network node is a source radio network node for the nested conditional handover configuration. Alternatively or additionally, the method may further comprise receiving the nested conditional handover configuration from a target radio network node for the nested conditional handover configuration.

Embodiments herein also include corresponding apparatus, computer programs, and carriers of those computer programs. For example, embodiments herein include a wireless device, e.g., comprising communication circuitry and processing circuitry. The wireless device is configured to receive a control message that indicates a nested conditional configuration. The nested conditional configuration includes an outer conditional configuration that the wireless device is to apply if the wireless device detects fulfillment of an outer trigger condition. The nested conditional configuration also includes an inner conditional configuration that the wireless device is to apply if the wireless device detects fulfillment of both the outer trigger condition and an inner trigger condition.

Embodiments further include a radio network node, e.g., comprising communication circuitry and processing circuitry. The network node is configured to transmit, to a wireless device, a control message that indicates a nested conditional configuration. The nested conditional configuration includes an outer conditional configuration that the wireless device is to apply if the wireless device detects fulfillment of an outer trigger condition. The nested conditional configuration also includes an inner conditional configuration that the wireless device is to apply if the wireless device detects fulfillment of both the outer trigger condition and an inner trigger condition.

Still other embodiments herein include a radio network node and a method performed by such a radio network node. The radio network node transmits, to another radio network node, control signalling that indicates a nested conditional configuration as described according to any of the embodiments above.

DETAILED DESCRIPTION

Figure 1:
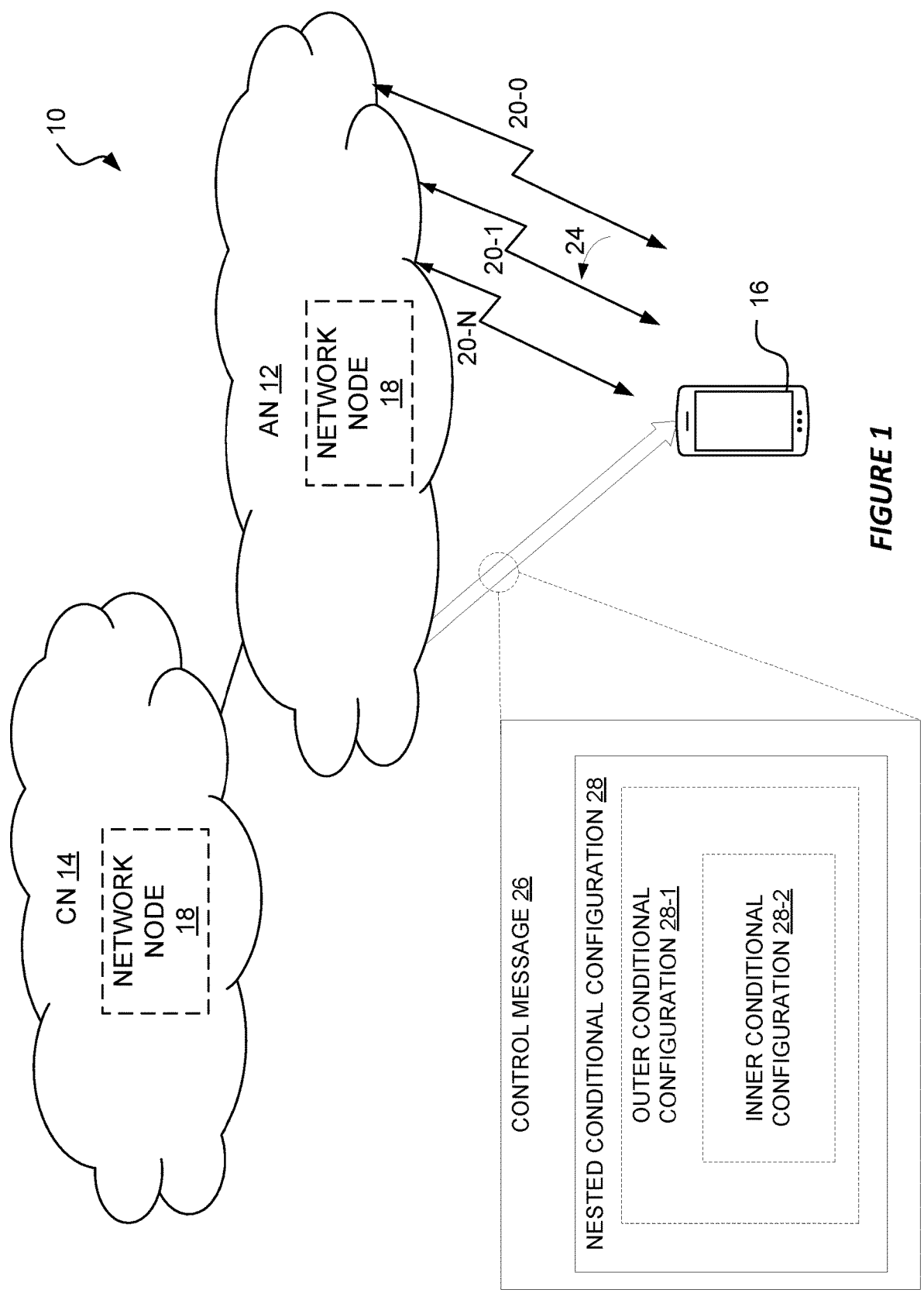
FIG. 1 is a block diagram of a wireless communication network according to some embodiments.

FIG. 1 illustrates a wireless communication network 10 according to one or more embodiments. As shown, the network 10, e.g., a 5G network or New Radio, NR, network, may include an access network (AN) 12 and a core network (CN) 14. The AN 12 wirelessly connects a wireless communication device 16 (or simply "wireless device 16") to the CN 14. The CN 14 in turn connects the wireless device 16 to one or more external networks (not shown), such as a public switched telephone network and/or a packet data network, e.g., the Internet.

The AN 12 provides links via which the wireless device 16 may wirelessly access the system 10, e.g., using uplink and/or downlink communications. The AN 12 may for example provide links 20-0, 20-1, . . . 20-N (generally links 20) in the form of access nodes (e.g., base stations), cells, sectors, beams, carriers, or the like. Some links 20 may provide wireless coverage over different geographical areas.

The network 10, e.g., via one or more network nodes 18 in the AN 12 and/or CN 14, may control configuration of the wireless device 16 in a number of respects. That is, the network 10 may control application by the wireless device 16 of different possible types of configurations. For example, the network 10 may control the device's configuration in terms of which link 20 the device 16 uses to access the network 10, e.g., in or for a so-called connected mode, which may for instance be a mode in which the device 16 has established a radio resource control, RRC, connection with the network 10, in contrast with an RRC idle mode in which no RRC connection is established. The network 10 in this regard may transmit to the wireless device 16 a type of configuration (e.g., a mobility configuration such as a handover configuration) that, when applied by the wireless device 16, configures the device 16 to use certain link(s) 20 to access the network 10. In some embodiments, a mobility configuration may for example configure the device 16 to perform a mobility procedure that causes the device 16 to switch 24 from accessing the network 10 via one link to accessing the system via another link, e.g., in connected mode. In some embodiments, this link switch 24 may be a handover. In another respect, the network 10 may control the device's configuration in terms of how many links the device 16 uses to access the network 10, e.g., in the context of dual connectivity, carrier aggregation, or the like. For example, the network 10 may signal a different type of configuration to the device 16 for adding a secondary cell group (SCG) or a secondary cell. In still other embodiments, the network 10 may signal another type of configuration to the device 16 for resuming a connection, e.g., an RRC connection resume, for a reconfiguration with sync, for a reconfiguration, for a reestablishment, or the like. In yet other respects, the network 10 may signal a different type of configuration that configures the wireless device 16 to perform a measurement, or still another type of configuration that configures the wireless device 16 to record/log certain information.

According to embodiments herein, the network 10 may transmit a configuration to the wireless device 16 but indicate that the wireless device 16 is to only conditionally apply that configuration. In particular, the wireless device 16 is to apply the configuration if/when the wireless device 16 detects fulfillment of one or more trigger conditions e.g., the source radio link quality deteriorates even further below a different threshold. Once the device detects the condition, the device 16 may autonomously apply the configuration without receiving any other signaling. Such a configuration is referred to as a conditional configuration because it its application is conditional on fulfillment of trigger condition(s).

In this context, the network node 18 in the embodiments shown in FIG. 1 may transmit to the wireless device 16 a control message 26, e.g., in the form of an RRC message such as an RRC reconfiguration message or an RRC conditional reconfiguration message. The control message 26 may indicate a so-called nested conditional configuration 28, e.g., a nested conditional handover configuration. The nested conditional configuration 28 in some sense effectively nests an inner conditional configuration within an outer conditional configuration, at least in the sense that the trigger condition for the inner conditional configuration is nested within the trigger condition for the outer conditional configuration. The trigger condition for the inner conditional configuration is referred to as an inner trigger condition, whereas the trigger condition for the outer conditional configuration is referred to as an outer trigger condition. The nested nature of the nested conditional configuration 28 means that, effectively, the wireless device's application of the inner conditional configuration depends on both the outer trigger condition and the inner trigger condition.

More particularly, the nested conditional configuration 28 in some embodiments as shown includes an outer conditional configuration 28-1 and an inner conditional configuration 28-2. The outer conditional configuration 28-1 is to be applied if the wireless device 16 detects fulfillment of an outer trigger condition. Due to the nested nature of the nested conditional configuration 28, effectively, the inner conditional configuration 28-2 is to be applied if the wireless device 16 detects fulfillment of both the outer trigger condition and an inner trigger condition. With application of the inner conditional configuration 28-2 effectively conditional on both the inner trigger condition and the outer trigger condition, then, the conditional triggering of the inner conditional configuration 28-2 may be said to be nested within the conditional triggering of the outer conditional configuration 28-2.

In some embodiments, the inner conditional configuration 28-2 is actually nested within the outer conditional configuration 28-1 within the control message 26, i.e., the structure of the control message 26 itself reflects the nested nature of the nested conditional configuration 28. In other embodiments, by contrast, the control message 26 indicates the nested nature of the nested conditional configuration 28 by nesting the inner trigger condition within the outer trigger condition. In still other embodiments, the control message 26 indicates the nested nature of the nested conditional configuration 28 by simply indicating (e.g., via a flag) that the inner conditional configuration 28-2 is deemed nested within the outer conditional configuration 28-1.

No matter how the control message 26 indicates the nested nature of the nested conditional configuration 26, the wireless device 16 in some embodiments exploits that nested nature to optimize how it monitors for and/or performs measurements for the inner conditional configuration 28-2.

For example, in some embodiments, the wireless device 16 monitors for or evaluates fulfillment of the inner trigger condition only after the outer trigger condition has been fulfilled. That is, the wireless device 16 does not bother checking the inner trigger condition until after the outer trigger condition has been fulfilled. Alternatively or additionally, the wireless device 16 may perform a measurement on which fulfillment of the inner trigger condition depends, only after the outer trigger condition has been fulfilled. These and other optimizations may advantageously conserve processing resources at the wireless device 16, by refraining from needless monitoring of and/or measurement for the inner trigger condition, i.e., when, because the outer trigger condition has not been fulfilled, fulfillment of the inner trigger condition would not trigger application of the inner conditional configuration.

These embodiments demonstrate, then, that the nested nature of the nested conditional configuration 28 may be attributable to the way that the wireless device 16 is to monitor for and/or perform measurements for the inner trigger condition. By conditioning performance of the monitoring or measurement for the inner trigger condition on fulfillment of the outer trigger condition, some embodiments effectively dictate that the wireless device 16 will not apply the inner conditional configuration unless both the outer trigger condition and the inner trigger condition are fulfilled. Indeed, if the outer trigger condition is not fulfilled, the wireless device 16 will not even monitor or measure for fulfillment of the inner trigger condition. And, if the outer trigger condition is fulfilled so that wireless device 16 monitors and/or measures for fulfillment of the inner trigger condition, the wireless device 16 will still only apply the inner conditional configuration if the inner trigger condition is fulfilled also. Thus, if either the outer or the inner trigger condition is not fulfilled, the wireless device 16 will not apply the inner conditional configuration. And, if both the outer and the inner trigger conditions are fulfilled, the wireless device 16 will apply the inner conditional configuration.

Alternatively or additionally, the wireless device 16 may apply both the outer conditional configuration 28-1 and the inner conditional configuration 28-2 responsive to fulfillment of both the outer trigger condition and the inner trigger condition. In some embodiments, then, conditional application of both the outer conditional configuration 28-1 and the inner conditional configuration 28-2 may be effected in an efficient, "one-shot" manner via communication of a single control message 26, e.g., as opposed to a "two-step" approach in which the network node 18 signals the inner conditional configuration 28-2 to the wireless device 16 only after the wireless device 16 has applied the outer conditional configuration 28-1. Some embodiments may thereby reduce signaling overhead compared to alternative approaches.

Note though that in some embodiments the wireless device 16 applies only the outer conditional configuration 28-1, not the inner conditional configuration 28-2, responsive to expiration of a time limit for the inner trigger condition to be fulfilled after the outer trigger condition has been fulfilled. That is, if the inner trigger condition has not been fulfilled within a certain time after the outer trigger condition was fulfilled, the wireless device 16 only applies the outer conditional configuration 28-1. In some embodiments, the network node 18 transmits control signaling to the wireless device 16 indicating this time limit.

Some embodiments may find particular applicability in a multi-connectivity context. For example, in some embodiments, the outer conditional configuration 28-1 is to apply to a master radio network node or master cell group in multi-connectivity operation, and the inner conditional configuration 28-2 is to apply to a secondary radio network node or secondary cell group in multi-connectivity operation. In one embodiment, for instance, the outer conditional configuration 28-1 is a conditional handover configuration for conditional handover to a master radio network node or master cell group in multi-connectivity operation, and the inner conditional configuration 28-2 is a conditional secondary configuration for conditionally adding or changing a secondary radio network node or a secondary cell group in multi-connectivity operation. Regardless, in these and other embodiments, the network node 18 from which the wireless device 16 receives the control message 18 may be a source radio network node for the nested conditional configuration 28.

Note that the outer trigger condition may comprise or be formed from one or more trigger subconditions (e.g., where each subcondition is the occurrence of a defined event, e.g., event A3). Similarly, the inner trigger condition may comprise or be formed from one or more trigger subconditions (e.g., where each subcondition is the occurrence of a defined event, e.g., event A3).

Figure 2:
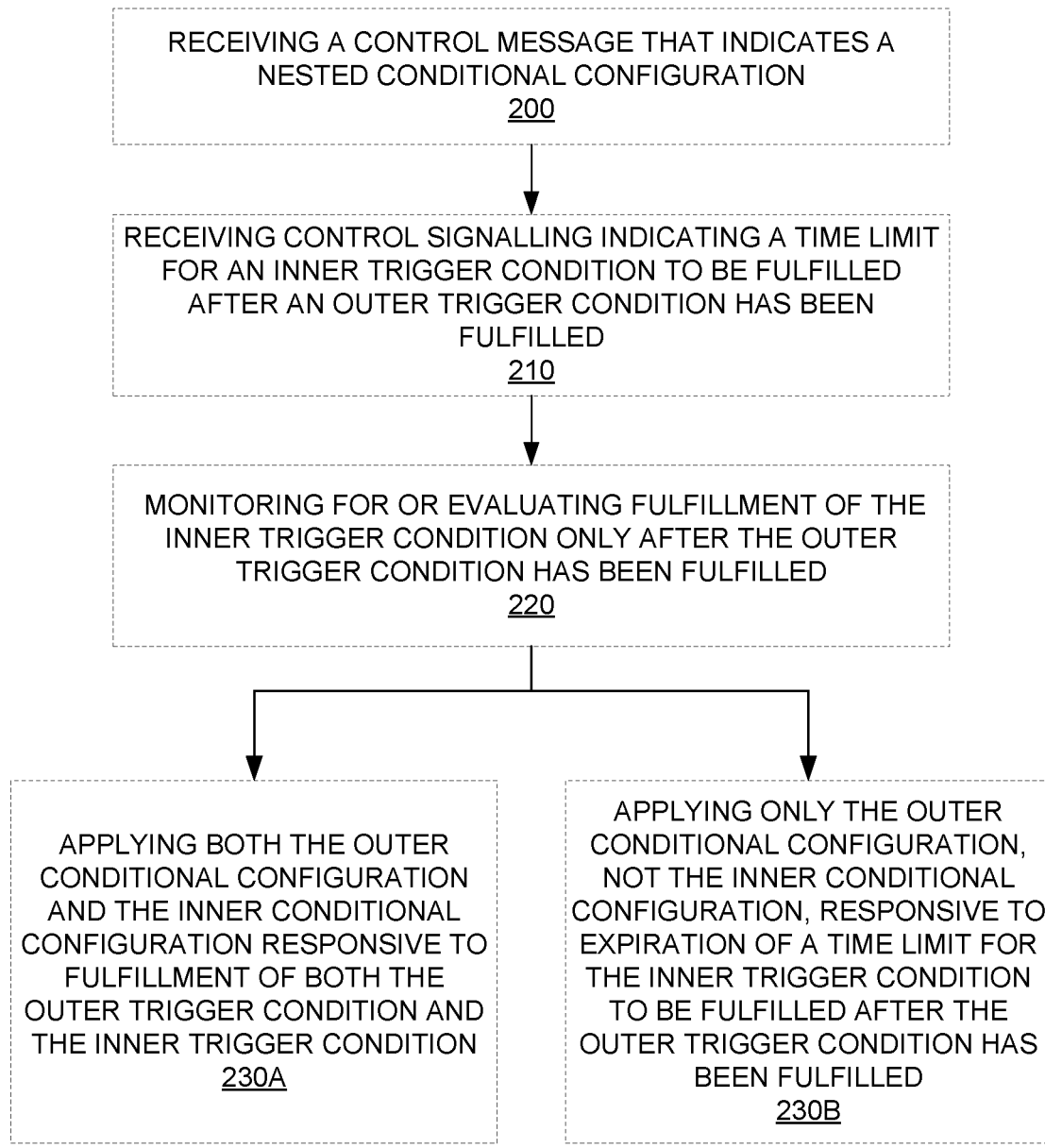
FIG. 2 is a logic flow diagram of a method performed by a wireless device according to some embodiments.

In view of the above modifications and variations, FIG. 2 depicts a method performed by a wireless device 16 in accordance with particular embodiments. The method includes receiving a control message 26 that indicates a nested conditional configuration 28 (Block 200). In some embodiments, the nested conditional configuration 28 includes an outer conditional configuration 28-1 that the wireless device 16 is to apply if the wireless device 16 detects fulfillment of an outer trigger condition. The nested conditional configuration 28 also includes an inner conditional configuration 28-2 that the wireless device 16 is to apply if the wireless device 16 detects fulfillment of both the outer trigger condition and an inner trigger condition.

In some embodiments, the outer conditional configuration 28-1 is to apply to a master radio network node or master cell group in multi-connectivity operation, and the inner conditional configuration 28-2 is to apply to a secondary radio network node or secondary cell group in multi-connectivity operation.

In some embodiments, the method additionally or alternatively includes receiving control signalling indicating a time limit for an inner trigger condition to be fulfilled after an outer trigger condition has been fulfilled (block 210).

In some embodiments, the method includes monitoring for or evaluating fulfillment of the inner trigger condition only after the outer trigger condition has been fulfilled (Block 220).

In some embodiments, the method additionally or alternatively includes performing a measurement on which fulfillment of the inner trigger condition depends, only after the outer trigger condition has been fulfilled.

In some embodiments, the method comprises applying both the outer conditional configuration 28-1 and the inner conditional configuration 28-2 responsive to fulfillment of both the outer trigger condition and the inner trigger condition (Block 230A). In other embodiments, the method comprises applying only the outer conditional configuration 28-1, not the inner conditional configuration 28-2, responsive to expiration of a time limit for the inner trigger condition to be fulfilled after the outer trigger condition has been fulfilled (Block 230B).

In some embodiments, the method comprises, after detecting fulfillment of the outer trigger condition, stopping monitoring for fulfillment of the inner trigger condition responsive to detecting that the outer trigger condition is no longer fulfilled. In other embodiments, the method comprises, after detecting fulfillment of the inner trigger condition, re-checking if the outer trigger condition is still fulfilled, and applying at least the inner trigger condition if the re-checking indicates the outer trigger condition is still fulfilled.

In some embodiments, the method comprises, after applying both the outer conditional configuration 28-2 and the inner conditional configuration 28-1, transmitting a nested control message that indicates the wireless device 16 applied the outer conditional configuration 28-1 and that includes an embedded control message that indicates the wireless device 16 applied the inner conditional configuration 28-2.

In some embodiments, the nested conditional configuration 28 is a nested conditional handover configuration.

Although not shown in the Figures, other embodiments herein include a method performed by a wireless device 16. The method comprises receiving control signalling indicating a time limit for an inner trigger condition to be fulfilled after an outer trigger condition has been fulfilled. The wireless device 16 is configured to apply an outer conditional configuration 28-1 of a nested conditional configuration 28 if the outer trigger condition is fulfilled and to apply an inner conditional configuration 28-2 of the nested conditional configuration 28 if both the outer trigger condition and the inner trigger condition are fulfilled.

Figure 3:
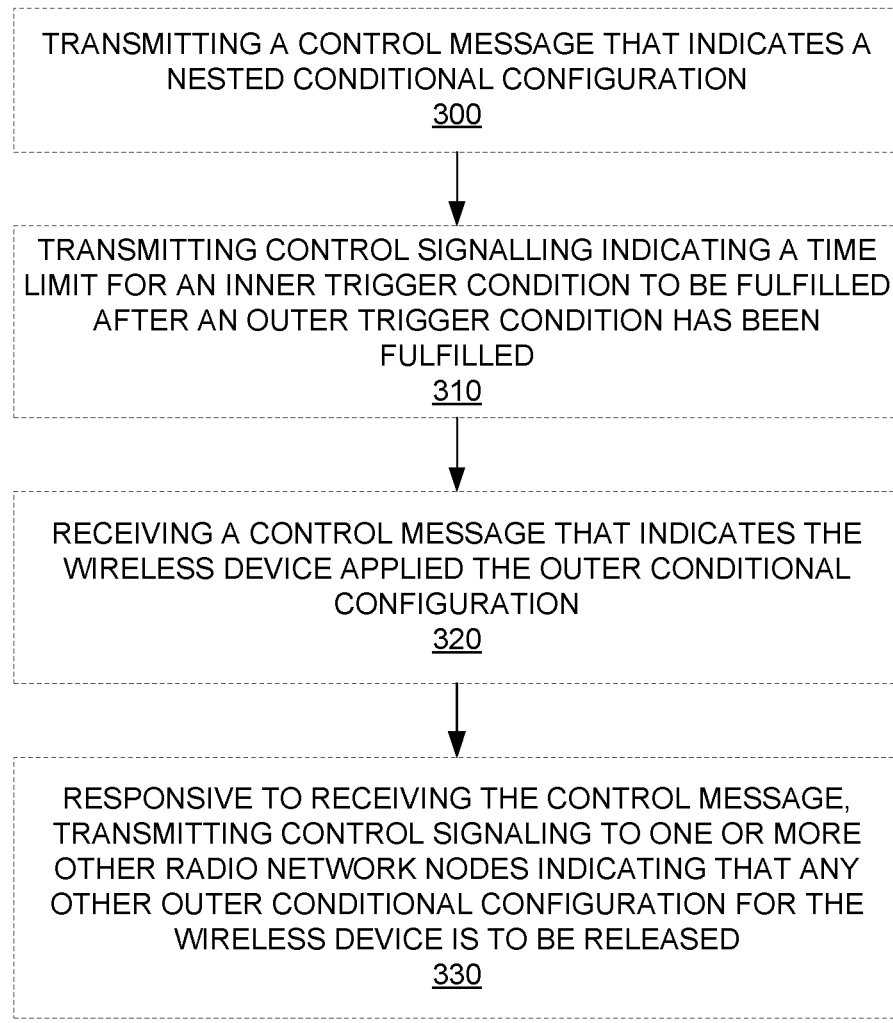
FIG. 3 is a logic flow diagram of a method performed by a radio network node according to some embodiments.

FIG. 3 depicts a method performed by a radio network node (e.g., network node 18 in the AN 12) in accordance with other particular embodiments. The method includes transmitting, to a wireless device 16, a control message 26 that indicates a nested conditional configuration 28 (Block 300). In some embodiments, the nested conditional configuration 28 includes an outer conditional configuration 28-1 that the wireless device 16 is to apply if the wireless device 16 detects fulfillment of an outer trigger condition. The nested conditional configuration 28 also includes an inner conditional configuration 28-2 that the wireless device 16 is to apply if the wireless device 16 detects fulfillment of both the outer trigger condition and an inner trigger condition.

In some embodiments, the outer conditional configuration 28-1 is to apply to a master radio network node or master cell group in multi-connectivity operation, and the inner conditional configuration 28-2 is to apply to a secondary radio network node or secondary cell group in multi-connectivity operation.

In some embodiments, the method additionally or alternatively includes transmitting control signalling indicating a time limit for an inner trigger condition to be fulfilled after an outer trigger condition has been fulfilled (block 310).

In some embodiments, the method also comprises receiving a control message that indicates the wireless device 16 applied the outer conditional configuration 28-1 (Block 320). In such a case, the method may also comprise, responsive to receiving the control message 26, transmitting control signaling to one or more other radio network nodes indicating that any other outer conditional configuration for the wireless device 16 is to be released (Block 330).

In some embodiments, the method comprises receiving a nested control message that indicates the wireless device 16 applied the outer conditional configuration 28-1 and that includes an embedded control message that indicates the wireless device 16 applied the inner conditional configuration 28-2.

In some embodiments, the nested conditional configuration 28 is a nested conditional handover configuration. In one such embodiment, the radio network node is a source radio network node for the nested conditional handover configuration 28. Alternatively or additionally in such an embodiment, the method may comprise receiving the nested conditional handover configuration from a target radio network node for the nested conditional handover configuration.

Although not shown, other embodiments herein include a method performed by a radio network node (e.g., network node 18 in the AN 12). The method comprises receiving, from another radio network node, control signalling that indicates a nested conditional configuration 28. The nested conditional configuration 28 includes an outer conditional configuration 28-1 that a wireless device 16 is to apply if the wireless device 16 detects fulfillment of an outer trigger condition, and an inner conditional configuration 28-2 that the wireless device 16 is to apply if the wireless device 16 detects fulfillment of both the outer trigger condition and an inner trigger condition. In some embodiments, the method further comprises transmitting a request for the nested conditional configuration 28. In this case, said receiving is responsive to transmitting the request.

Figure 4:
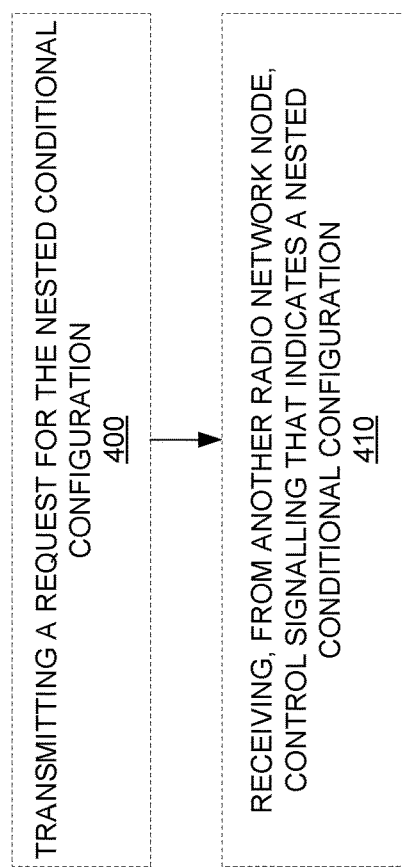
FIG. 4 is a logic flow diagram of a method performed by a radio network node according to other embodiments.

FIG. 4 depicts a method performed by a radio network node (e.g., network node 18 in AN 12) in accordance with other particular embodiments. The method includes transmitting a request for the nested conditional configuration 28, e.g., to another radio network node (Block 400). The method may alternatively or additionally include receiving, from another radio network node, control signalling that indicates a nested conditional configuration 28 (Block 410). The nested conditional configuration 28 includes an outer conditional configuration 28-1 that a wireless device 16 is to apply if the wireless device 16 detects fulfillment of an outer trigger condition, and an inner conditional configuration 28-2 that the wireless device 16 is to apply if the wireless device 16 detects fulfillment of both the outer trigger condition and an inner trigger condition.

Figure 5:
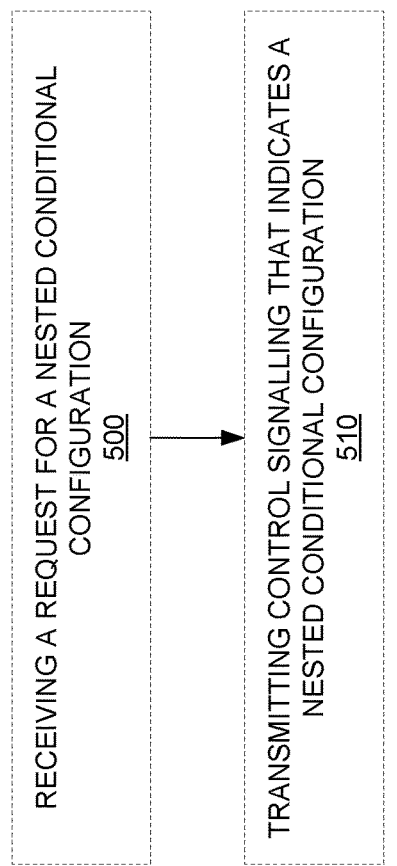
FIG. 5 is a logic flow diagram of a method performed by a radio network node according to still other embodiments.

FIG. 5 depicts a method performed by a radio network node (e.g., network node 18 in the AN 12) in accordance with still other particular embodiments. The method includes receiving a request for the nested conditional configuration 28, e.g., from another radio network node (Block 500). The method may alternatively or additionally include transmitting, to another radio network node, control signalling that indicates a nested conditional configuration 28 (Block 510). The nested conditional configuration 28 includes an outer conditional configuration 28-1 that a wireless device 16 is to apply if the wireless device 16 detects fulfillment of an outer trigger condition, and an inner conditional configuration 28-1 that the wireless device 16 is to apply if the wireless device 16 detects fulfillment of both the outer trigger condition and an inner trigger condition.

In some embodiments where said control signaling is transmitted, the method may further comprise receiving a request for the nested conditional configuration 28 and wherein said transmitting is responsive to transmitting the request. Alternatively or additionally, the method may further comprise transmitting, to a secondary radio network node, a request for the inner conditional configuration 28-2, and receiving the inner conditional configuration 28-2 from the secondary radio network node in response to the request. In this case, the method may further comprise compiling the nested conditional configuration 28 using the received inner conditional configuration 28-2.

Embodiments herein further include a method performed by a secondary radio network node (e.g., network node 18 in AN 12). The method comprises receiving, from a primary or master radio network node, a request for an inner conditional configuration 28-2 that the wireless device 16 is to apply as part of a nested conditional configuration 28. The nested conditional configuration 28 includes an outer conditional configuration 28-1 that a wireless device 16 is to apply if the wireless device 16 detects fulfillment of an outer trigger condition; and the inner conditional configuration 28-2 that the wireless device 16 is to apply if the wireless device 16 detects fulfillment of both the outer trigger condition and an inner trigger condition.

Embodiments herein also include a method performed by a radio network node (e.g., network node 18 in AN 12). The method comprises receiving, from another radio network node, a request for a nested conditional configuration 28. The nested conditional configuration 28 includes an outer conditional configuration 28-1 that a wireless device 16 is to apply if the wireless device 16 detects fulfillment of an outer trigger condition and an inner conditional configuration 28-2 that the wireless device 16 is to apply if the wireless device 16 detects fulfillment of both the outer trigger condition and an inner trigger condition.

Embodiments herein also include a method performed by a radio network node (e.g., network node 18 in AN 12). The method comprises transmitting control signalling indicating a time limit for an inner trigger condition to be fulfilled after an outer trigger condition has been fulfilled. A wireless device 16 is configured to apply an outer conditional configuration 28-1 of a nested conditional configuration 28 if the outer trigger condition is fulfilled and to apply an inner conditional configuration 28-2 of the nested conditional configuration 28 if both the outer trigger condition and the inner trigger condition are fulfilled.

Embodiments herein also include corresponding apparatuses. Embodiments herein for instance include a wireless device configured to perform any of the steps of any of the embodiments described above for the wireless device.

Embodiments also include a wireless device 16 comprising processing circuitry and power supply circuitry. The processing circuitry is configured to perform any of the steps of any of the embodiments described above for the wireless device 16. The power supply circuitry is configured to supply power to the wireless device 16.

Embodiments further include a wireless device 16 comprising processing circuitry. The processing circuitry is configured to perform any of the steps of any of the embodiments described above for the wireless device 16. In some embodiments, the wireless device 16 further comprises communication circuitry.

Embodiments further include a wireless device 16 comprising processing circuitry and memory. The memory contains instructions executable by the processing circuitry whereby the wireless device 16 is configured to perform any of the steps of any of the embodiments described above for the wireless device 16.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 16. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node (e.g., network node 18 in AN 12) configured to perform any of the steps of any of the embodiments described above for the radio network node.

Embodiments also include a radio network node (e.g., network node 18 in AN 12) comprising processing circuitry and power supply circuitry. The processing circuitry is configured to perform any of the steps of any of the embodiments described above for the radio network node. The power supply circuitry is configured to supply power to the radio network node.

Embodiments further include a radio network node (e.g., network node 18 in AN 12) comprising processing circuitry. The processing circuitry is configured to perform any of the steps of any of the embodiments described above for the radio network node. In some embodiments, the radio network node further comprises communication circuitry.

Embodiments further include a radio network node (e.g., network node 18 in AN 12) comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
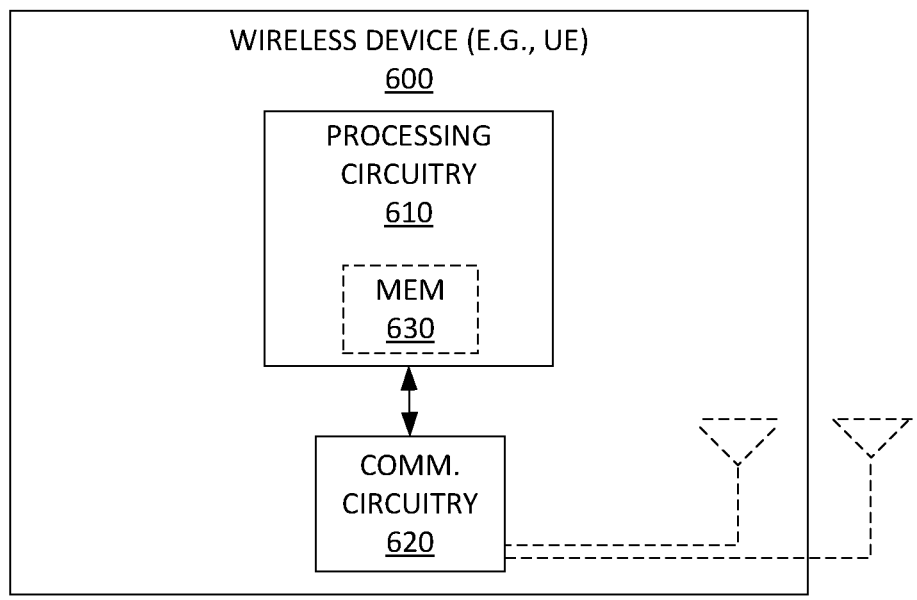
FIG. 6 is a block diagram of a wireless device according to some embodiments.

FIG. 6 for example illustrates a wireless device 600 (e.g., wireless device 16) as implemented in accordance with one or more embodiments. As shown, the wireless device 600 includes processing circuitry 610 and communication circuitry 620. The communication circuitry 620 (e.g., radio circuitry) is configured to transmit and/or receive information to and/or from one or more other nodes, e.g., via any communication technology. Such communication may occur via one or more antennas that are either internal or external to the wireless device 600. The processing circuitry 610 is configured to perform processing described above, e.g., in FIG. 2, such as by executing instructions stored in memory 630. The processing circuitry 610 in this regard may implement certain functional means, units, or modules.

Figure 7:
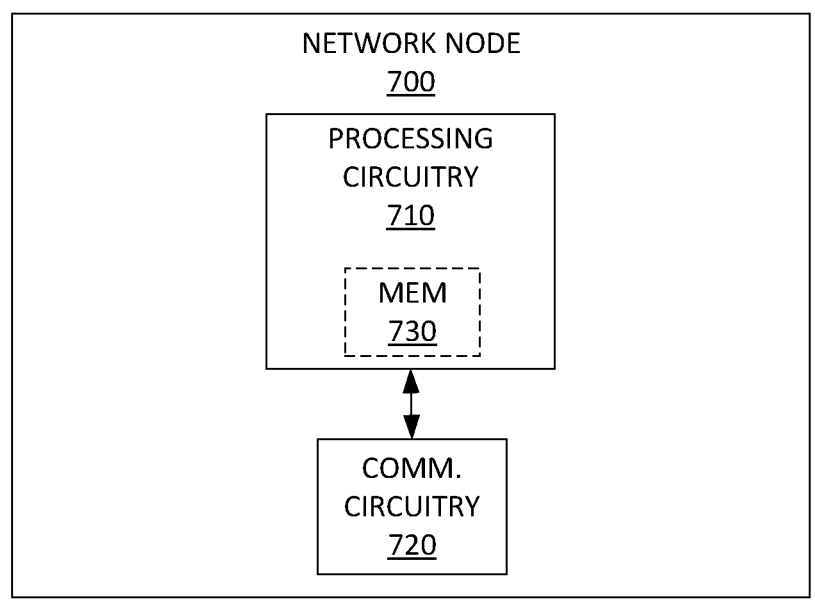
FIG. 7 is a block diagram of a network node according to some embodiments.

FIG. 7 illustrates a network node 700 (e.g., network node 18) as implemented in accordance with one or more embodiments. As shown, the network node 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, e.g., in any of FIGS. 3-5, such as by executing instructions stored in memory 730. The processing circuitry 710 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In these embodiments, the wireless device 16 may be exemplified as a user equipment (UE) and the nested conditional configuration 28 may be exemplified as a nested conditional handover (CHO) configuration, e.g., in the context of dual connectivity (DC).

Some embodiments in this regard may be applicable to address a problem related to robustness at handover (HO). If the HO Command (RRCConnectionReconfiguration with mobilityControlInfo and RRCReconfiguration with a reconfigurationWithSync field) is sent when the radio conditions for the UE are already quite bad, that may lead to that the HO Command may not reach the UE in time if the message is segmented or there are retransmissions.

Some embodiments provide a solution to increase mobility robustness, e.g., in Long Term Evolution (LTE) and New Radio (NR), via a "conditional handover" or "early handover command". In order to avoid the undesired dependence on the serving radio link upon the time (and radio conditions) where the UE should execute the handover, some embodiments provide Radio Resource Control (RRC) signaling for the handover to the UE earlier. To achieve this, some embodiments associate the HO command with a condition e.g. based on radio conditions possibly similar to the ones associated to an A3 event, where a given neighbour becomes X db better than target. As soon as the condition is fulfilled, the UE executes the handover in accordance with the provided handover command.

Such a condition could e.g. be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold) which is considered optimal for the handover execution.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell.

Figure 8:
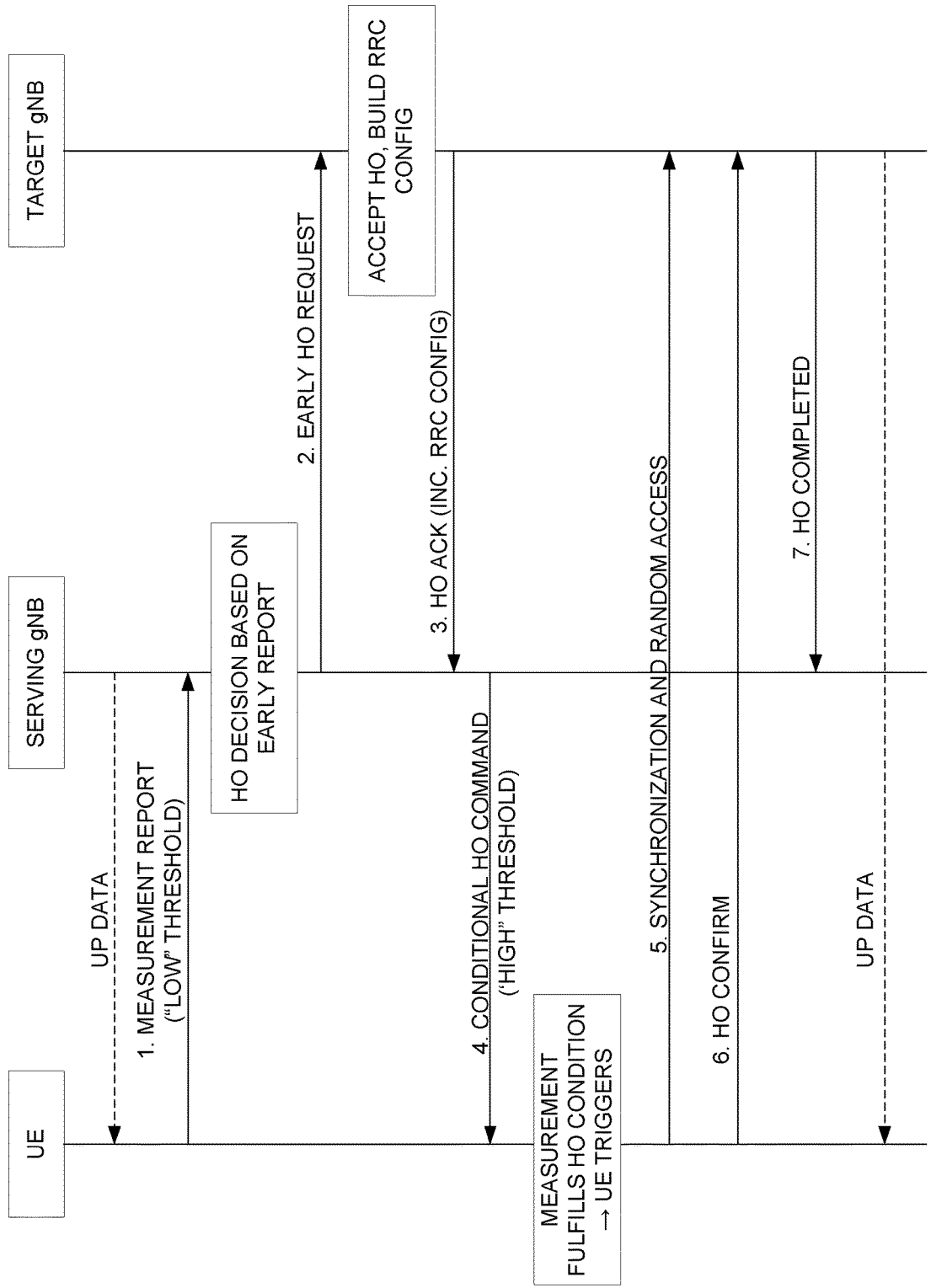
FIG. 8 is a call flow diagram of a conditional handover procedure according to some embodiments.

FIG. 8 depicts an example. In FIG. 8, the serving gNB may exchange user plane (UP) data with the UE. In step 1, the UE sends a measurement report with a "low" threshold to the serving gNB. The serving gNB makes a handover (HO) decision based on this early report. In step 2, the serving gNB sends an early HO request to a target gNB. The target gNB accepts the HO request and builds an RRC configuration. The target gNB returns a HO acknowledgement, including the RRC configuration, to the serving gNB in step 3. In step 4, a conditional HO command with a "high" threshold is sent to the UE. Subsequently, measurements by the UE may fulfil the HO condition of the conditional HO command. The UE thus triggers the pending conditional handover. The UE performs synchronization and random access with the target gNB in step 5, and HO confirm is exchanged in step 6. In step 7, the target gNB informs the serving gNB that HO is completed. The target gNB may then exchange user plane (UP) data with the UE.

Note that FIG. 8 depicted an example with just a serving and a target cell. In practice there may often be many cells or beams that the UE reported as possible candidates based on its preceding radio resource management (RRM) measurements. The network should then have the freedom to issue conditional handover commands for several of those candidates. The RRCConnectionReconfiguration (or RRCReconfiguration, in NR) for each of those candidates may differ e.g. in terms of the HO execution condition (reference signal, RS, to measure and threshold to exceed), in terms of the random access (RA) preamble to be sent when a condition is met or the configuration itself to be used in a specific target candidate.

A conditional handover (CHO) is defined as a UE having network configuration for initiating access to a target cell based on configuration condition(s). Usage of conditional handover is decided by the network. The UE evaluates when the condition is valid. The baseline operation for Conditional HO procedure assumes a HO command type of message contains HO triggering condition(s) and dedicated RRC configuration(s). The UE accesses the prepared target when the relevant condition is met. The baseline operation for Conditional HO assumes the source RAN remains responsible for RRC until the UE successfully sends RRC Reconfiguration Complete message to the target RAN. Cell level quality and/or beam level quality may be used as baseline for CHO execution condition. Ax events (entry condition) are used for CHO execution condition and A3/5 as baseline. Trigger quantity for CHO execution condition (RSRP, RSRQ or RS-SINR) is configured by network.

Carrier Aggregation (CA)

Some embodiments may be applicable in the context of carrier aggregation (CA). For example, NR supports the concept of carrier aggregation allowing a UE to utilize multiple carriers, or serving cells, as they are sometimes referred to. This allows that the UE can use more bandwidth and hence potential throughputs, but also, and perhaps more critical in some cases, it allows the UE to use scattered bandwidths. It is likely that an operator has access to several bandwidths, potentially in different frequency bands, and with carrier aggregation these bandwidths can be used for one UE even though they are separated in frequency.

A terminal may be configured with a subset of the cells offered by the network and the number of aggregated cells configured for one terminal can change dynamically through time based on for example terminal traffic demand, type of service used by the terminal, system load etc. A cell which a terminal is configured to use is referred to as a serving cell for that terminal. A terminal has one primary serving cell (called PCell) and zero or more secondary serving cells (SCells). The term serving cell includes both the PCell and SCells. Which cell is a terminal's PCell is terminal-specific. The PCell is considered more important and for example some control signaling is handled via the PCell.

Although there is a difference in meaning, for the sake of readability the term serving cell will in some cases be replaced by the term cell, but it is expected that a person skilled in the art will understand the difference where this replacement has been done.

Dual Connectivity

Some embodiments may alternatively or additionally be applicable in the context of dual connectivity (DC). In the $3^{rd}$ Generation Partnership Project (3GPP) the dual-connectivity (DC) solution has been specified, both for LTE and NR, as well as between LTE and NR. In DC, two nodes are involved, a master node (MN) and a Secondary Node (SN). The configuration regarding the MN is known as the Master Cell Group (MCG) configuration, while that regarding the SN is known as the Secondary Cell Group (SCG) configuration. Also, DC can also be used in the Ultra Reliable Low Latency Communications (URLLC) cases in order to enhance the robustness and to avoid connection interruptions. In DC, both the MN and SN can operate in CA, where the MCG configuration contains the configuration of the Primary Cell (PCell) and MCG Secondary Cells (SCells), while the SCG configuration contains the Primary Secondary Cell (PSCell) and SCG Secondary Cells (SCells).

In some embodiments, the MN provides a single control plane connection for the UE to the core network. That is, the SN does not provide any control plane connection for the UE to the core network, but instead is controlled via the MN.

Inter-RAT and Inter 5GC Inworking in LTE and NR

Figure 9:
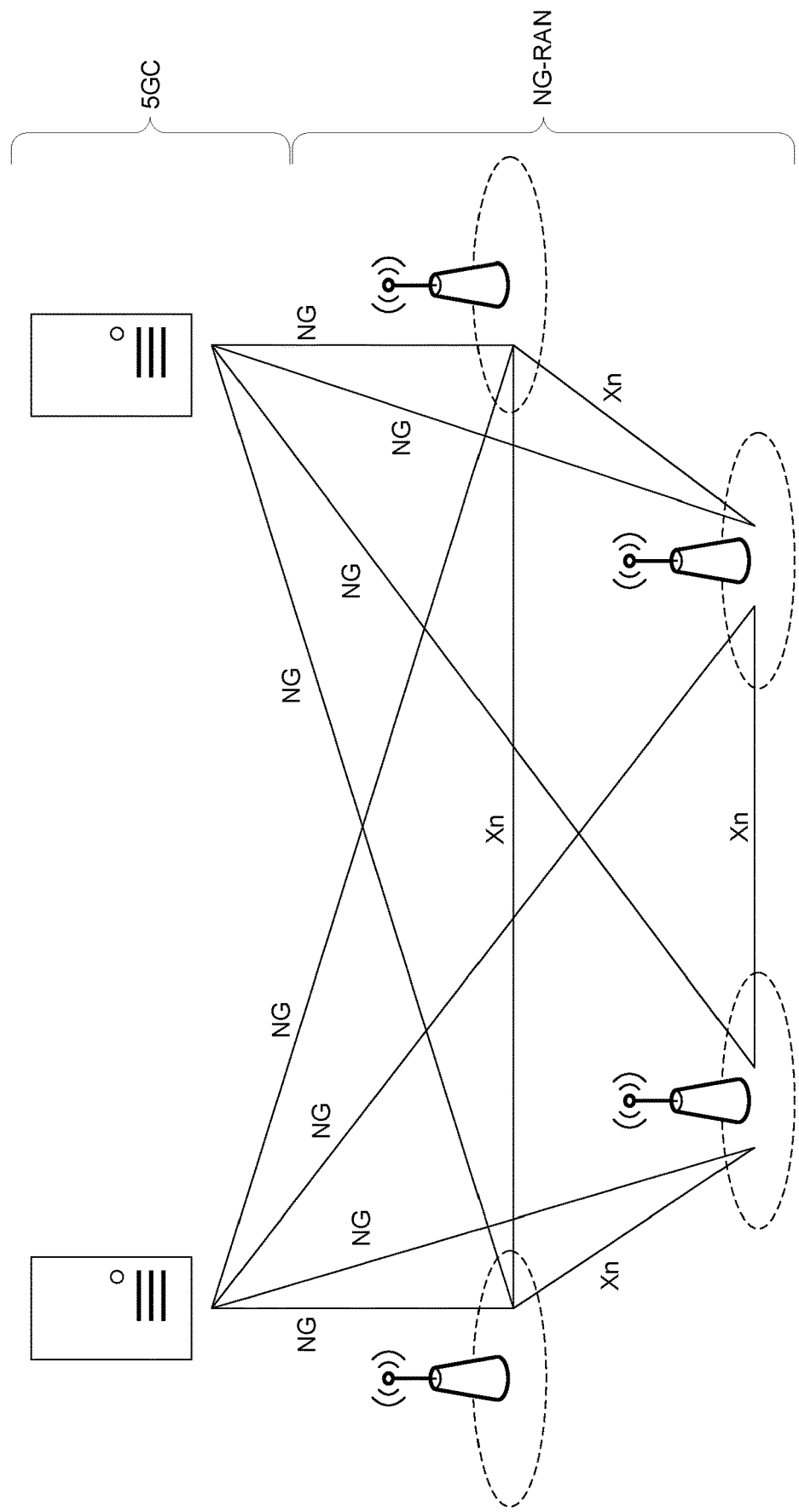
FIG. 9 is a block diagram of a 5G network according to some embodiments.

Some embodiments are alternatively or additionally applicable to 5G, whereby 3GPP introduces both a new core network (5GC) and a new Radio Access Network (NR). The core network, 5GC, will however, also support radio access technologies (RATs) other than NR. It has been agreed that LTE (or E-UTRA) should also be connected to 5GC. LTE base stations (eNBs) may also be connected to 5GC, be called ng-eNB, and be part of the NG-RAN which also consist of NR base stations called gNBs. FIG. 9 shows how the base stations are connected to each other and the nodes in 5GC.

LTE and NR/EPS and 5GS

Figure 10A:
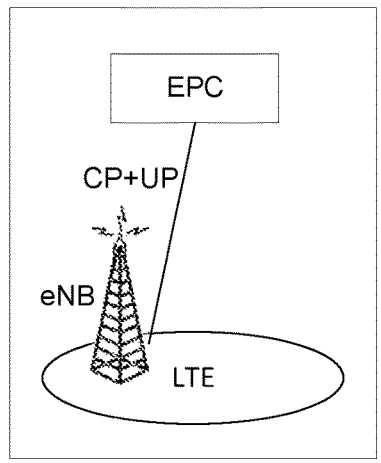
FIGS. 10A-10B are block diagrams of different options for the architecture of inter-working between a 5G network and an LTE network according to some embodiments.
Figure 10A:
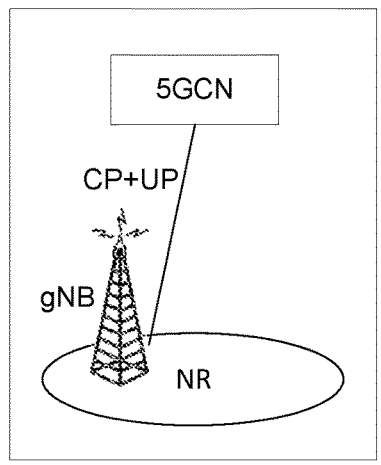
Figure 10A:
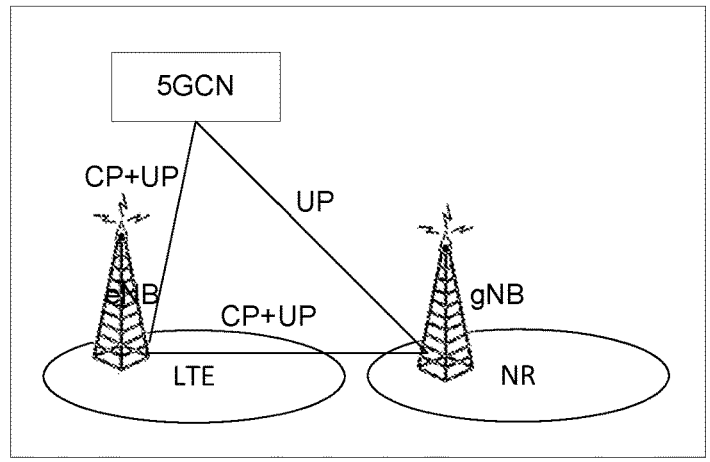
Figure 10B:
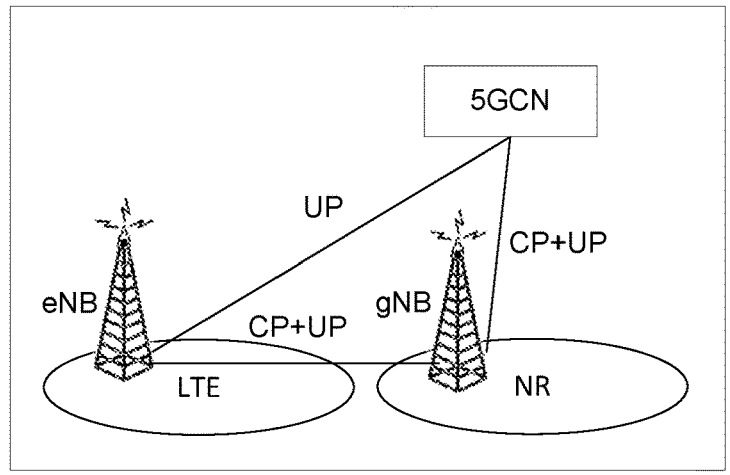
Figure 10B:
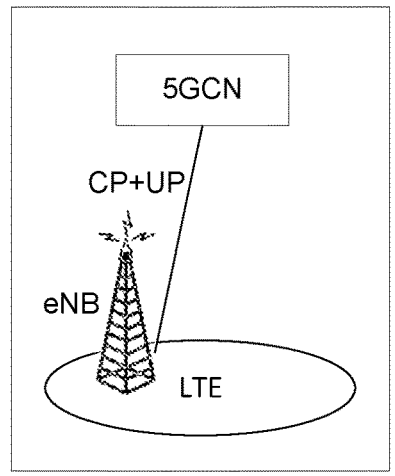
Figure 10B:
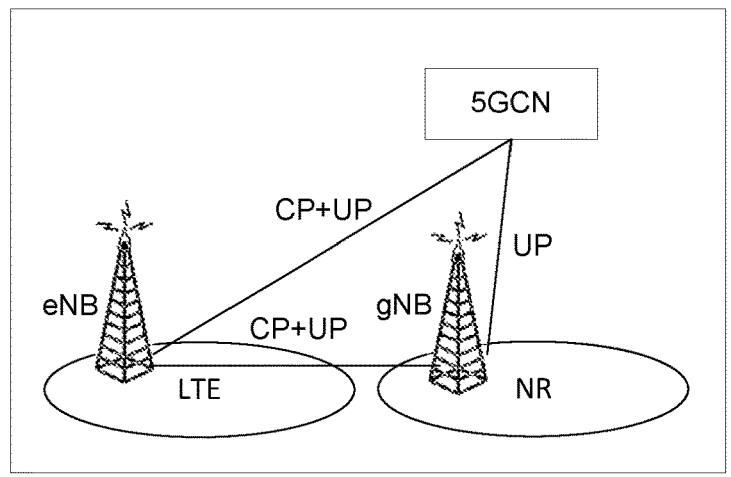

There are different ways to deploy a 5G network with or without interworking with LTE (also referred to as E-UTRA) and evolved packet core (EPC), as depicted in FIG. 10A and FIG. 10B. In principle, NR and LTE can be deployed without any interworking, denoted by NR stand-alone (SA) operation, that is gNB in NR can be connected to 5G core network (5GC) and eNB can be connected to EPC with no interconnection between the two (Option 1 and Option 2 in FIG. 10A). On the other hand, the first supported version of NR is the so-called EN-DC (E-UTRAN-NR Dual Connectivity), illustrated by Option 3. In such a deployment, dual connectivity between NR and LTE is applied with LTE as the master and NR as the secondary node. The RAN node (gNB) supporting NR, may not have a control plane connection to core network (EPC), instead it relies on the LTE as master node (MeNB). This is also called as "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE can also be connected to 5GC using option 5 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that, Option 4 and option 7 are other variants of dual connectivity between LTE and NR which will be standardized as part of NG-RAN connected to 5GC, denoted by MR-DC (Multi-Radio Dual Connectivity). Under the MR-DC umbrella, there is:

EN-DC (Option 3): LTE is the master node and NR is the secondary (EPC CN employed)
NE-DC (Option 4): NR is the master node and LTE is the secondary (5GC employed)
NGEN-DC (Option 7): LTE is the master node and NR is the secondary (5GC employed)
NR-DC (variant of Option 2): Dual connectivity where both the master and secondary are NR (5GC employed).

As migration for these options may differ from different operators, it is possible to have deployments with multiple options in parallel in the same network e.g. there could be eNB base station supporting option 3, 5 and 7 in the same network as NR base station supporting 2 and 4. In combination with dual connectivity solutions between LTE and NR it is also possible to support CA (Carrier Aggregation) in each cell group (i.e. MCG and SCG) and dual connectivity between nodes on the same RAT (e.g. NR-NR DC). For the LTE cells, a consequence of these different deployments is the co-existence of LTE cells associated with eNBs connected to EPC, 5GC or both EPC/5GC.

DC Operations

Consider additional details about embodiments applicable to dual connectivity. The general operations related to MR-DC are captured in 3GPP Technical Specification (TS) 37.340 v15.6.0 and the ones related to MR-DC with 5GC are described herein (while for EN-DC, procedures slightly differ and can be found in clause 10 from TS 37.340 v15.6.0).

Secondary Node Addition

Figure 11:
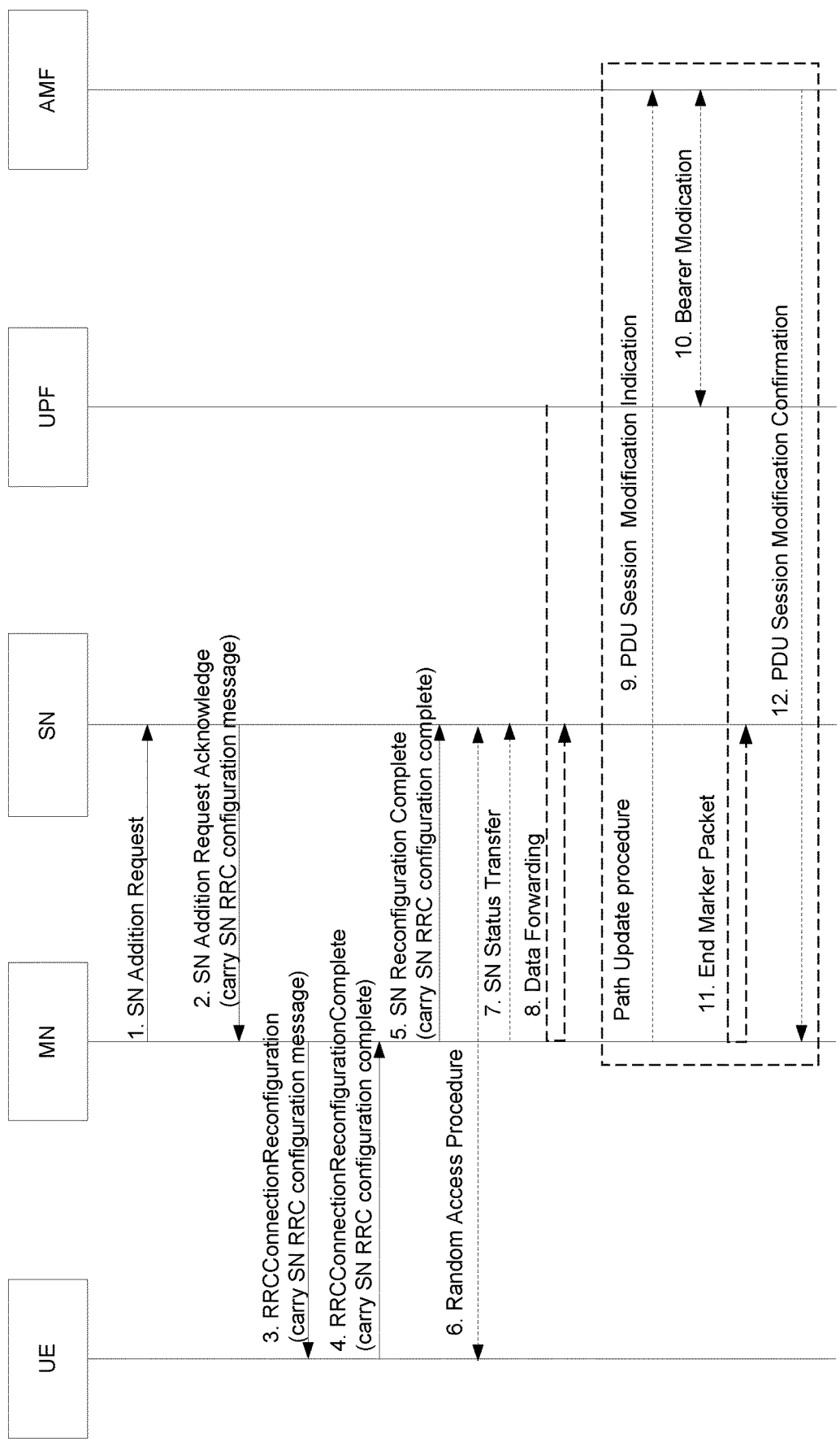
FIG. 11 is a call flow diagram of an SN Addition procedure according to some embodiments.

The Secondary Node (SN) Addition procedure is initiated by the MN and is used to establish a UE context at the SN in order to provide radio resources from the SN to the UE. For bearers requiring SCG radio resources, this procedure is used to add at least the initial SCG serving cell of the SCG. This procedure can also be used to configure an SN terminated MCG bearer (where no SCG configuration is needed). FIG. 11 shows the SN Addition procedure.

Step 1. The MN decides to request the target SN to allocate radio resources for one or more specific Packet Data Unit (PDU) Sessions/Quality of Service (QoS) Flows, indicating QoS Flows characteristics (QoS Flow Level QoS parameters, PDU session level Transport Network Level (TNL) address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split Signaling Radio Bearer (SRB) operation. The MN always provides all the needed security information to the SN (even if no SN terminated bearers are setup) to enable SRB3 to be setup based on SN decision. For bearer options that require Xn-U resources between the MN and the SN, MN needs to provide Xn-U TNL address information, Xn-U DL TNL address information for SN terminated bearers and Xn-U UL TNL address information for MN terminated bearers. The SN may reject the request.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signalled to the SN, which may differ from QoS Flow parameters received over NG.

NOTE 2: For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

Step 2. If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration can be performed. The SN decides for the PScell and other SCG Scells and provides the new SCG radio resource configuration to the MN in a SN RRC configuration message contained in the SN Addition Request Acknowledge message. In case of bearer options that require Xn-U resources between the MN and the SN, the SN provides Xn-U TNL address information for the respective E-RAB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided.

NOTE 3: In case of MN terminated bearers, transmission of user plane data may take place after step 2.

NOTE 4: In case of SN terminated bearers, data forwarding and the SN Status Transfer may take place after step 2.

NOTE 5: For MN terminated NR SCG bearers for which Packet Data Convergence Protocol (PDCP) duplication with CA is configured the MN allocates 2 separate Xn-U bearers.

For SN terminated NR MCG bearers for which PDCP duplication with CA is configured the SN allocates 2 separate Xn-U bearers.

Step 3. The MN sends the MN RRC reconfiguration message to the UE including the SN RRC configuration message, without modifying it.

Step 4. The UE applies the new configuration and replies to MN with MN RRC reconfiguration complete message, including a SN RRC response message for SN, if needed. In case the UE is unable to comply with (part of) the configuration included in the MN RRC reconfiguration message, it performs the reconfiguration failure procedure.

Step 5. The MN informs the SN that the UE has completed the reconfiguration procedure successfully via SN Reconfiguration Complete message, including the encoded SN RRC response message, if received from the UE.

Step 6. If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure.

Step 7. In case of SN terminated bearers using Radio Link Control (RLC) Acknowledgement Mode (AM), the MN sends SN Status Transfer.

Step 8. In case of SN terminated bearers using RLC AM, and dependent on the bearer characteristics of the respective QoS Flows, the MN may take actions to minimise service interruption due to activation of MR-DC (Data forwarding).

Steps 9-12. For SN terminated bearers, the update of the UP path towards the 5GC is performed via PDU Session Path Update procedure.

Secondary Node Release (MN/SN Initiated)

The SN Release procedure may be initiated either by the MN or by the SN and is used to initiate the release of the UE context and relevant resources at the SN. The recipient node of this request can reject it, e.g., if a SN change procedure is triggered by the SN.

Figure 12:
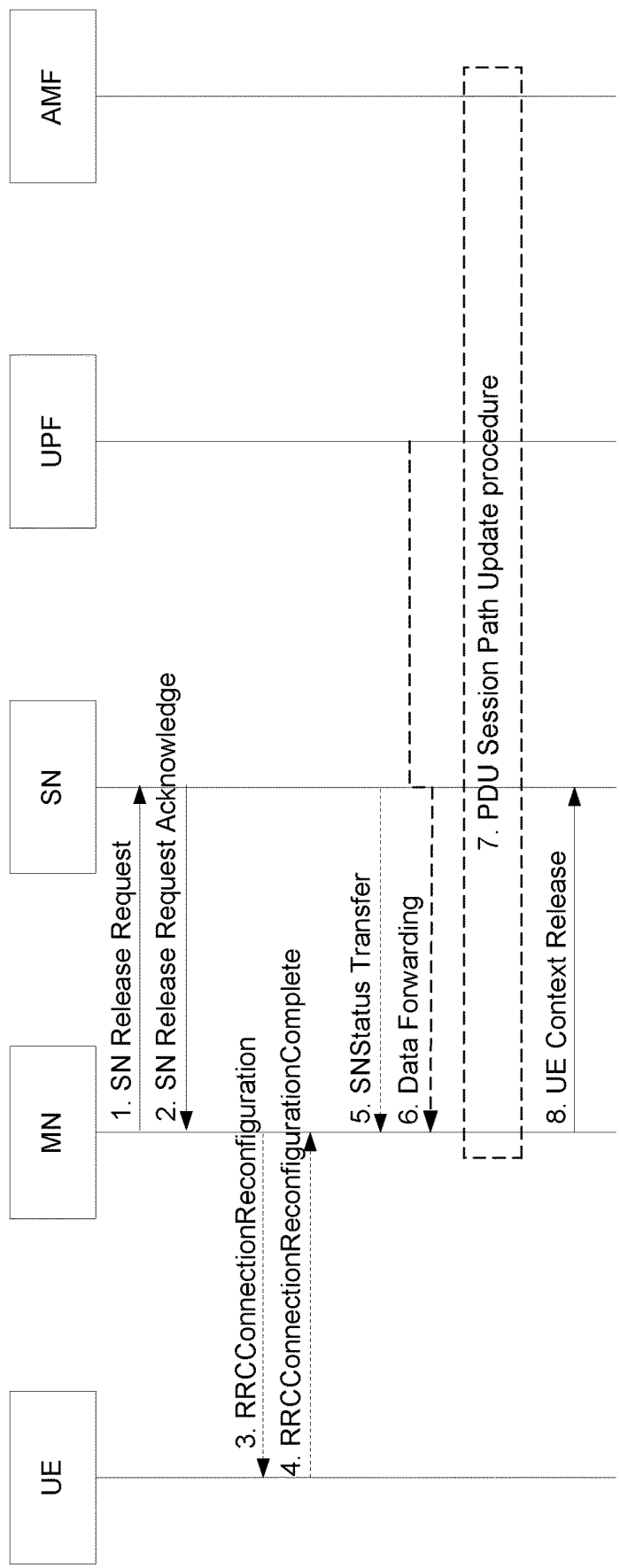
FIG. 12 is a call flow diagram of an MN initiated SN Release procedure according to some embodiments.

FIG. 12 shows an example signalling flow for the MN initiated SN Release procedure.

Step 1. The MN initiates the procedure by sending the SN Release Request message. If data forwarding is requested, the MN provides data forwarding addresses to the SN.

Step 2. The SN confirms SN Release by sending the SN Release Request Acknowledge message. If appropriate, the SN may reject SN Release, e.g., if the SN change procedure is triggered by the SN.

Steps 3/4. If required, the MN indicates in the MN RRC reconfiguration message towards the UE that the UE shall release the entire SCG configuration. In case the UE is unable to comply with (part of) the configuration included in the MN RRC reconfiguration message, it performs the reconfiguration failure procedure.

NOTE 1: If data forwarding is applied, timely coordination between steps 1 and 2 may minimize gaps in service provision, this is however regarded to be an implementation matter.

Step 5. If the released bearers use RLC AM, the SN sends the SN Status transfer.

Step 6. Data forwarding from the SN to the MN takes place.

Step 7. If applicable, the PDU Session path update procedure is initiated.

Step 8. Upon reception of the UE Context Release message, the SN can release radio and C-plane related resource associated to the UE context. Any ongoing data forwarding may continue.

Figure 13:
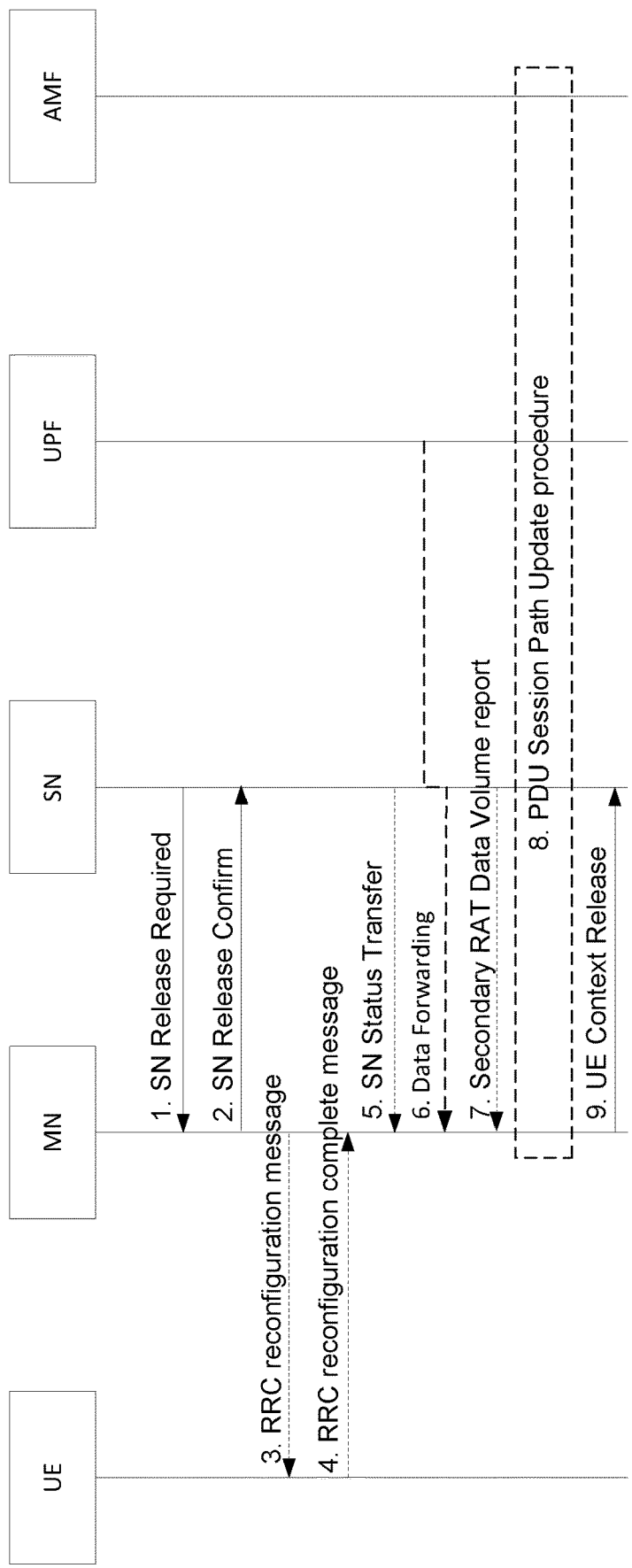
FIG. 13 is a call flow diagram of an SN initiated SN Release procedure according to some embodiments.

FIG. 13 shows an example signalling flow for the SN initiated SN Release procedure.

Step 1. The SN initiates the procedure by sending the SN Release Required message which does not contain any inter-node message.

Step 2. If data forwarding is requested, the MN provides data forwarding addresses to the SN in the SN Release Confirm message. The SN may start data forwarding and stop providing user data to the UE as early as it receives the SN Release Confirm message.

Steps 3/4. If required, the MN indicates in the MN RRC reconfiguration message towards the UE that the UE shall release the entire SCG configuration. In case the UE is unable to comply with (part of) the configuration included in the MN RRC reconfiguration message, it performs the reconfiguration failure procedure.

NOTE 2: If data forwarding is applied, timely coordination between steps 2 and 3 may minimize gaps in service provision. This is however regarded to be an implementation matter.

Step 5. If the released bearers use RLC AM, the SN sends the SN Status transfer.

Step 6. Data forwarding from the SN to the MN takes place.

Step 7. The SN sends the Secondary RAT Data Volume Report message to the MN and includes the data volumes delivered to the UE as described in section 10.11.2.

NOTE 3: The order the SN sends the Secondary RAT Data Volume Report message and performs data forwarding with MN is not defined. The SN may send the report when the transmission of the related QoS flow is stopped.

Step 8. If applicable, the PDU Session path update procedure is initiated.

Step 9. Upon reception of the UE Context Release message, the SN can release radio and C-plane related resource associated to the UE context. Any ongoing data forwarding may continue.

Secondary Node Change (MN/SN Initiated)

MN Initiated SN Change

The MN initiated SN change procedure is used to transfer a UE context from the source SN to a target SN and to change the SCG configuration in UE from one SN to another.

The Secondary Node Change procedure always involves signalling over MCG SRB towards the UE.

Figure 14:
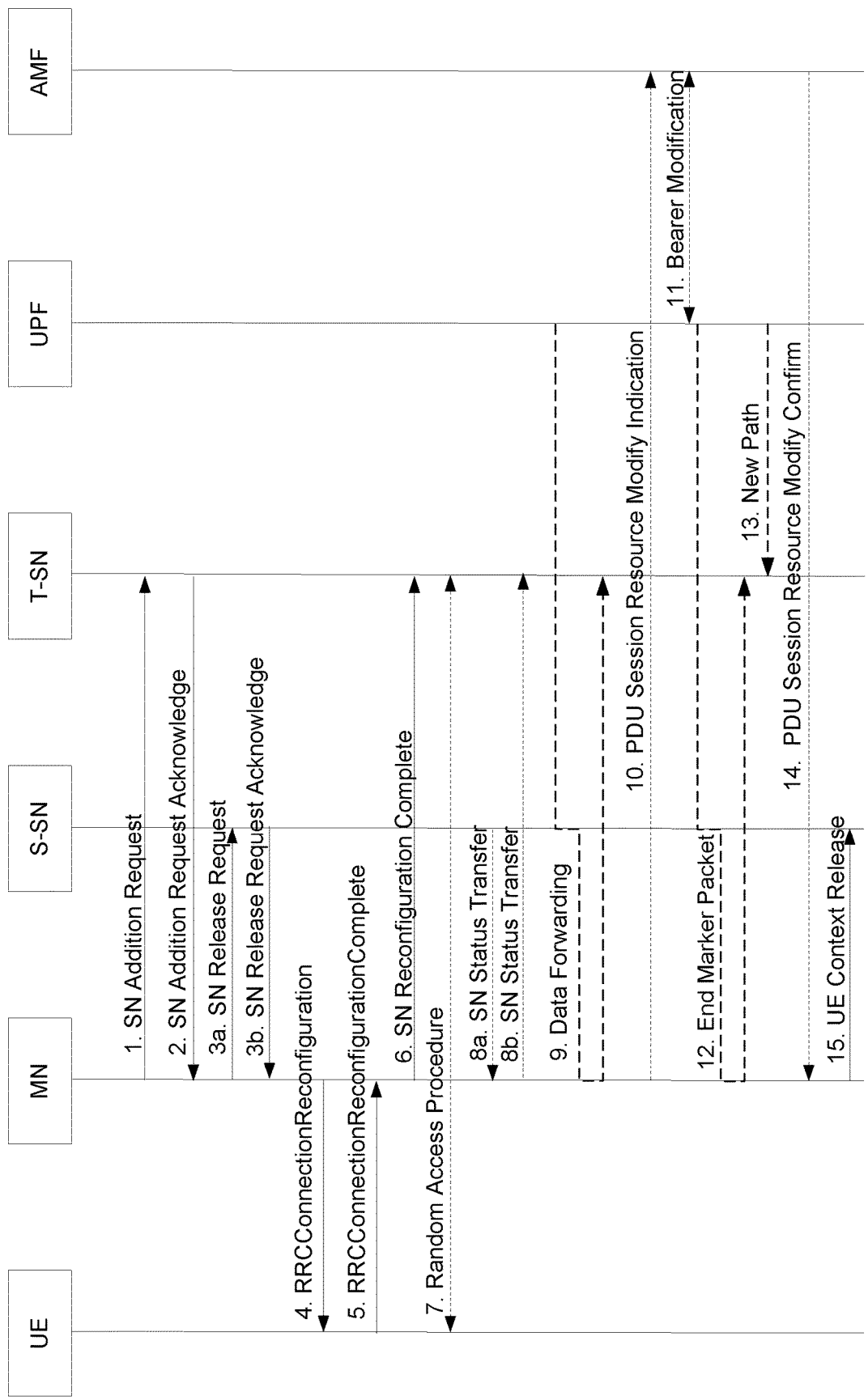
FIG. 14 is a call flow diagram of an SN Change procedure initiated by the MN according to some embodiments.

FIG. 14 shows an example signalling flow for the SN Change initiated by the MN:

Steps 1/2. The MN initiates the SN change by requesting the target SN to allocate resources for the UE by means of the SN Addition procedure. The MN may include measurement results related to the target SN. If data forwarding is needed, the target SN provides data forwarding addresses to the MN. The target SN includes the indication of the full or delta RRC configuration.

NOTE: The MN may send the SN Modification Request message (to the source SN) to request the current SCG configuration before step 1.

Step 3. If the allocation of target SN resources was successful, the MN initiates the release of the source SN resources including a Cause indicating SCG mobility. The Source SN may reject the release. If data forwarding is needed the MN provides data forwarding addresses to the source SN. If direct data forwarding is used for SN terminated bearers, the MN provides data forwarding addresses as received from the target SN to source SN. Reception of the SN Release Request message triggers the source SN to stop providing user data to the UE and, if applicable, to start data forwarding.

Steps 4/5. The MN triggers the UE to apply the new configuration. The MN indicates the new configuration to the UE in the MN RRC reconfiguration message including the target SN RRC configuration message. The UE applies the new configuration and sends the MN RRC reconfiguration complete message, including the encoded SN RRC response message for the target SN, if needed. In case the UE is unable to comply with (part of) the configuration included in the MN RRC reconfiguration message, it performs the reconfiguration failure procedure.

Step 6. If the RRC connection reconfiguration procedure was successful, the MN informs the target SN via SN Reconfiguration Complete message with the encoded SN RRC response message for the target SN, if received from the UE.

Step 7. If configured with bearers requiring SCG radio resources the UE synchronizes to the target SN.

Step 8. For SN terminated bearers using RLC AM, the source SN sends the SN Status transfer, which the MN sends then to the target SN.

Step 9. If applicable, data forwarding from the source SN takes place. It may be initiated as early as the source SN receives the SN Release Request message from the MN.

Steps 10-14. If one of the PDU session/QoS Flow was terminated at the source SN, path update procedure is triggered by the MN.

Step 15. Upon reception of the UE Context Release message, the source SN can release radio and C-plane related resource associated to the UE context. Any ongoing data forwarding may continue SN Initiated SN Change The SN initiated SN change procedure is used to transfer a UE context from the source SN to a target SN and to change the SCG configuration in UE from one SN to another.

Figure 15:
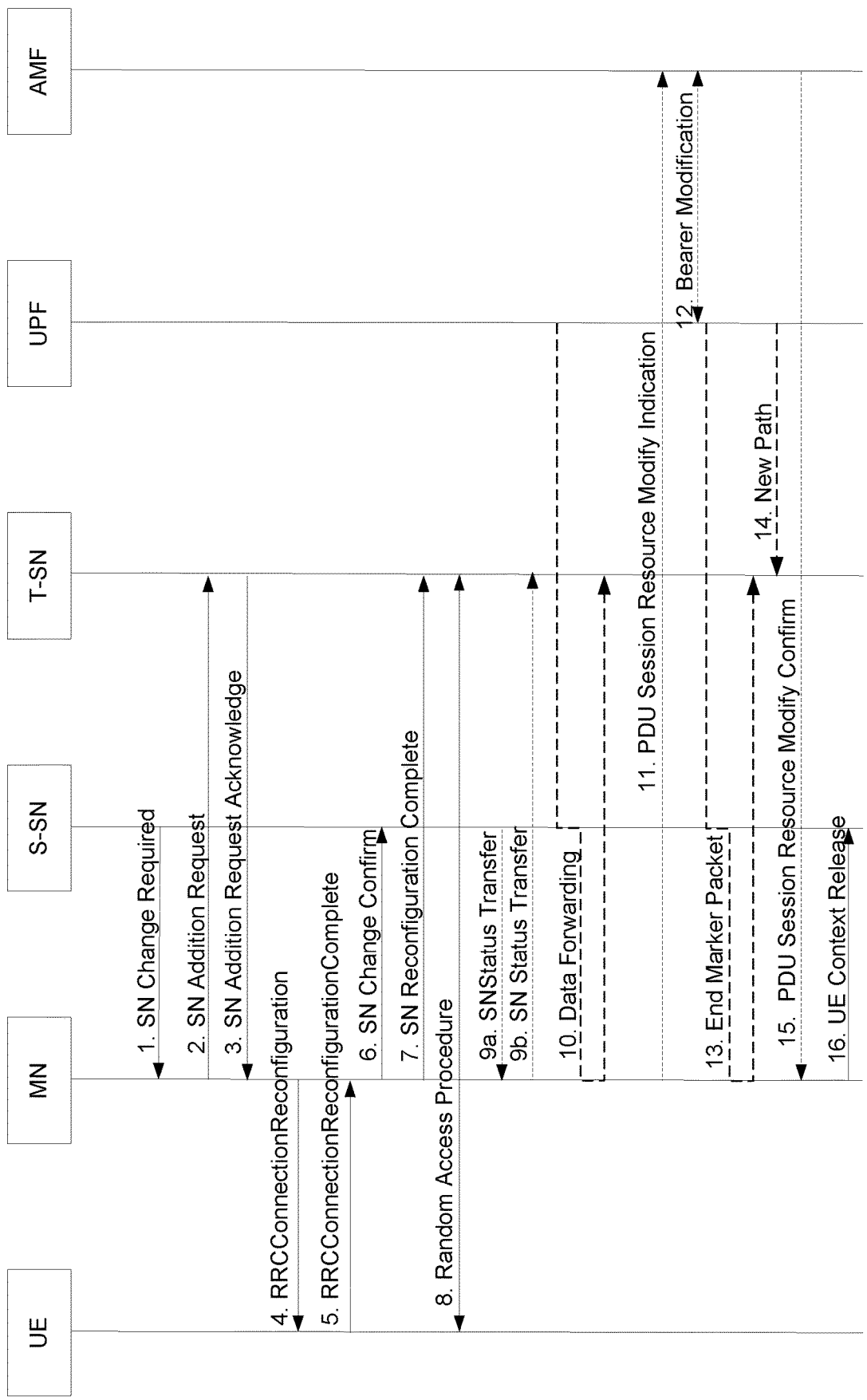
FIG. 15 is a call flow diagram of an SN Change procedure initiated by the SN according to some embodiments.

FIG. 15 shows an example signalling flow for the SN Change initiated by the SN:

Step 1. The source SN initiates the SN change procedure by sending the SN Change Required message, which contains a candidate target node ID and may include the SCG configuration (to support delta configuration) and measurement results related to the target SN.

Steps 2/3. The MN requests the target SN to allocate resources for the UE by means of the SN Addition procedure, including the measurement results related to the target SN received from the source SN. If data forwarding is needed, the target SN provides data forwarding addresses to the MN. The target SN includes the indication of the full or delta RRC configuration.

Steps 4/5. The MN triggers the UE to apply the new configuration. The MN indicates the new configuration to the UE in the MN RRC reconfiguration message including the SN RRC configuration message generated by the target SN. The UE applies the new configuration and sends the MN RRC reconfiguration complete message, including the encoded SN RRC response message for the target SN, if needed. In case the UE is unable to comply with (part of) the configuration included in the MN RRC reconfiguration message, it performs the reconfiguration failure procedure.

Step 6. If the allocation of target SN resources was successful, the MN confirms the change of the source SN. If data forwarding is needed the MN provides data forwarding addresses to the source SN. If direct data forwarding is used for SN terminated bearers, the MN provides data forwarding addresses as received from the target SN to source SN. Reception of the SN Change Confirm message triggers the source SN to stop providing user data to the UE and, if applicable, to start data forwarding.

Step 7. If the RRC connection reconfiguration procedure was successful, the MN informs the target SN via SN Reconfiguration Complete message with the encoded SN RRC response message for the target SN, if received from the UE.

Step 8. The UE synchronizes to the target SN.

Step 9. For SN terminated bearers using RLC AM, the source SN sends the SN Status transfer, which the MN sends then to the target SN.

Step 10. If applicable, data forwarding from the source SN takes place. It may be initiated as early as the source SN receives the SN Change Confirm message from the MN.

Steps 11-15. If one of the PDU session/QoS Flow was terminated at the source SN, path update procedure is triggered by the MN.

Step 16. Upon reception of the UE Context Release message, the source SN can release radio and C-plane related resource associated to the UE context. Any ongoing data forwarding may continue.

Conditional handover in 3GPP may be applied to a standalone case i.e. a UE receiving a set of configurations equivalent to an RRCReconfiguration with reconfiguration with sync, each associated with a trigger condition. Some embodiments herein may be applied where the conditional handover concept is used to conditionally add/change secondary nodes. For example, some embodiments may be applied where a UE in single connectivity receives an RRCReconfiguration with an SCG configuration and a trigger condition to apply that configuration and go to DC mode upon the fulfillment of the trigger conditions. Or, other embodiments may be applied where a UE in DC receives an RRCReconfiguration with reconfiguration with sync and a trigger condition to apply the configuration and change the SCG to the one specified in the configuration upon the fulfillment of the trigger condition. Yet other embodiments may be applied for conditionally resuming of the SCG. Generally, then, some embodiments address and provide a framework on how to handle conditional handovers that involve dual connectivity configurations.

Specifically, to exemplify the nested conditional configuration 28 of FIG. 1, some embodiments propose mechanisms to configure the UE with nested CHO configurations, where the outer (first) configurations are related to the master node (master cell group) configurations, while the inner (second) configurations are related to the secondary node (secondary cell group) configurations. Both inner and outer configurations have trigger conditions, and the trigger conditions for the inner configurations are checked only after the trigger conditions for the outer configurations are fulfilled. When both the outer and inner conditions are fulfilled, the UE applies the nested CHO configuration and performs a handover to the target master node associated with the chosen nested CHO configuration, while adding at the same time a target secondary node associated with the chosen nested CHO configuration. According to some embodiments, in case the first trigger conditions are fulfilled but no associated secondary configuration has its trigger condition fulfilled within a given duration (where the duration is a configurable parameter), the UE will execute the conditional handover configuration only according to the first configuration (i.e. without apply any SCG configuration).

Alternatively or additionally, some embodiments provide mechanisms at a source node and a target master node, as well as a target master node and a target secondary node, whereby the nodes communicate conditional handover requests and conditional secondary node addition requests as well as the response to these requests, which are then compiled at the source node to make the final nested CHO configuration that is sent to the UE.

Alternatively or additionally, some embodiments provide mechanisms at the network nodes whereby once a UE executes a certain nested CHO configuration, the other associated CHO configurations at other nodes (or even at the chosen target master and secondary nodes, but for CHO configurations other than the chosen one) are released (i.e. resources reserved/allocated for that UE for these configurations are released).

Certain embodiments may provide one or more of the following technical advantage(s). One advantage of some embodiments is to allow the possibility to have a conditional handover that can contain a dual connectivity configuration. The conditional handover is provided in a nested fashion, where the trigger conditions regarding the addition of the secondary node are evaluated only when the trigger conditions regarding the master cell configuration are fulfilled, thereby reducing the measurements required by the UE. For example, if the master cell group is operating in a certain frequency band (e.g. FR1<6 GHz) and the secondary cell group is operating in another frequency band (e.g. FR2>24 GHz), then the UE might require measurement gaps to perform measurements on both the candidate master and secondary target cells, which can degrade the throughput experienced by the UE (as the UE can not transmit/receive during measurement gap periods). Even if measurement gaps were not required (e.g. UE has separate transceivers for the two frequency bands and currently only has serving cells at the low frequency band), performing several measurements continuously could lead to fast battery drainage. Starting measurements regarding the target cells for secondary addition and evaluating the triggering conditions associated with them only after the conditions for the master target cell are fulfilled, will ensure that the measurements are performed only when needed.

Conditional HO trigger conditions that have been discussed so far have been associated with A3 event-based measurements (i.e. neighbor cell becomes better than the serving cell by a certain threshold). SN addition is usually based on A4 event-based measurement (i.e. neighbor cell becomes better than a certain threshold) for the sake of intra-RAT DC (e.g. LTE-DC, NR-DC) or B1 event-based (e.g. Inter-RAT neighbor cell becomes better than a certain threshold) for inter-RAT DC (e.g. EN-DC, NE-DC). The methods in some embodiments make it possible to "marry" the two types of measurements into one, in a time dependent fashion, so that the A3 type measurements are performed at the beginning, and the UE activates the A4/B1 type of measurements only when the trigger conditions for one or more of these measurements are fulfilled.

Without the methods herein, conditional handover to configure DC has to be performed as a two-step procedure, where a first CHO configuration will configure the UE with a set of target MN/MCGs. When the trigger conditions are fulfilled for one of these configurations, the UE would perform the handover to the selected target, and after that the UE can be configured with conditional SCG configurations. The UE would check the trigger conditions for these SCG configurations, and when one of them fulfills the conditions, the SCG can be added. The methods proposed herein provide a faster way of performing conditional HO involving DC setup, while at the same time reducing the signaling overhead, thus benefiting both the UE and the network.

UE Embodiments

Figure 16:
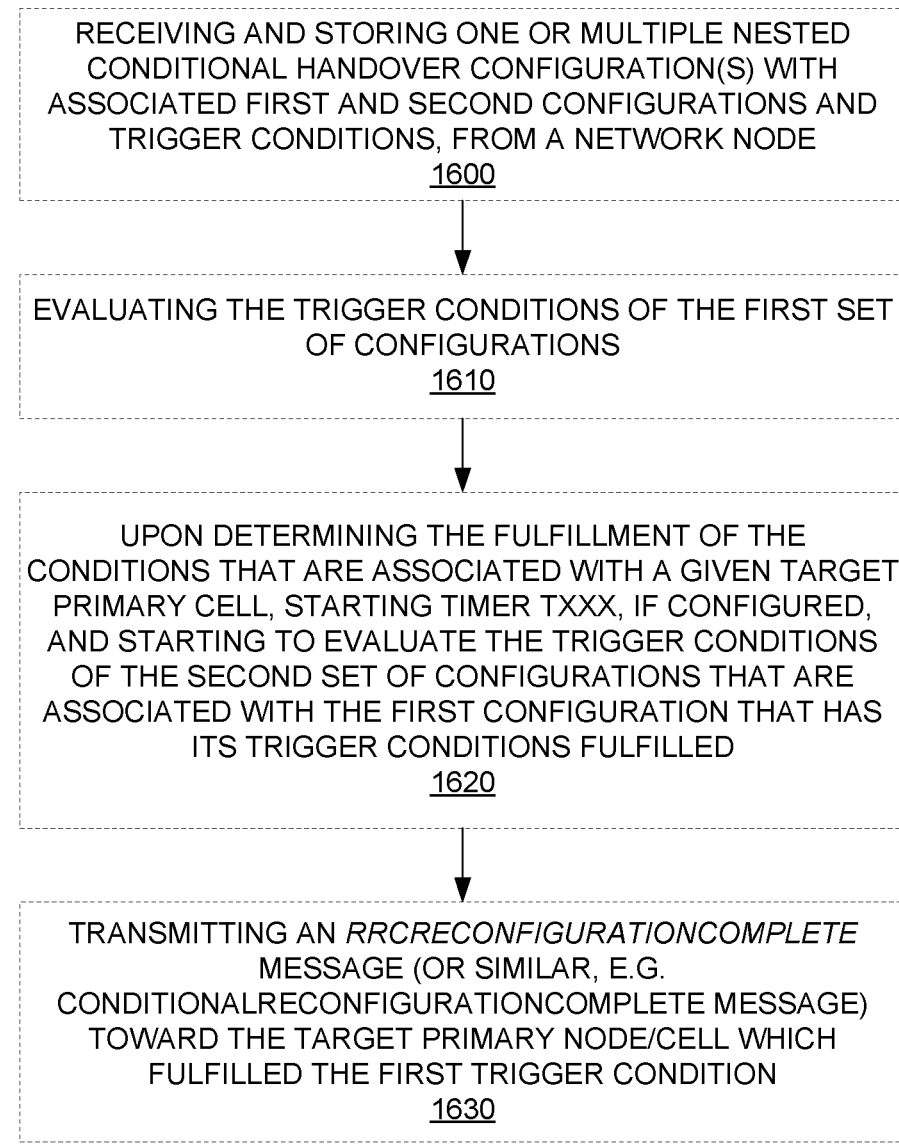
FIG. 16 is a logic flow diagram of a method performed by a UE according to some embodiments.

Some embodiments comprise a method at a UE (user equipment, wireless terminal) for handling nested conditional handovers configuration and execution. In some embodiments, the nested conditional configuration includes configurations for dual connectivity. FIG. 16 shows the method according to some embodiments. The method in FIG. 16 may be seen as a specific example of the method in FIG. 2, or may be implemented separate and apart from the method in FIG. 2.

As shown in FIG. 16, the method comprising one or more steps. The method may for example include the step of receiving and storing one or multiple nested conditional handover configuration(s) with associated first and second configurations and trigger conditions, from a network node (Step 1600). In some embodiments, each of these configurations are associated with an optional conditional configuration identifier.

In some embodiments, a nested conditional configuration for handling conditional handover execution contains a first and second set of configurations. The first set of configurations have associated trigger conditions to determine the most suitable target master node and associated cell group (MCG). There could be no more than one first configuration and trigger condition associated with a given candidate target master node. Or, there could be no more than one first configuration and trigger condition associated with a given candidate target master primary cell (PCell). Or, there could be more than one first configuration and trigger condition associated with a given candidate target master cell (PCell).

The second set of configurations have associated trigger conditions. Each second configuration is associated with at least one first set configuration, to be checked only after the trigger conditions for the associated first set configuration are fulfilled, to determine the most suitable target secondary node and associated secondary cell group (SCG). In some embodiments, there could be no more than one second configuration and trigger condition associated with a given candidate target secondary node. Or, there could be no more than one second configuration and trigger condition associated with a given candidate target primary secondary cell (PSCell). Or, there could be more than one second configuration and trigger condition associated with a given candidate target primary secondary cell (PSCell).

In some embodiments, the nested configuration also includes a timer value (e.g Txxx), which is used to determine the amount of time the UE has to check for the fulfillment of the trigger conditions for the second configurations associated with the first configuration, after the fulfillment of the conditions for the first configuration. There could be a Txxx value for each nested conditional configuration or the UE can be provided one value that is applicable to all configurations. Alternatively, there could be one Txxx value that is provided that is applicable to all, but it can be overridden by including a Txxx value in each nested configuration. Yet another alternative is to have a default Txxx value that is broadcasted in system information (either in the source cell or in one of the candidate primary cells), or provided in the 3GPP specifications (e.g. in TS 38.331, which is the RRC specifications), and it can be overridden in the nested conditional configuration.

In any event, the method in some embodiments may alternatively or additionally include evaluating the trigger conditions of the first set of configurations (Step 1610). Upon determining the fulfillment of the conditions that are associated with a given target primary cell (PCell), the method may comprise starting timer Txxx, if configured, and starting to evaluate the trigger conditions of the second set of configurations that are associated with the first configuration that has its trigger conditions fulfilled (Step 1620). If Txxx is configured and if the secondary trigger conditions are fulfilled for a secondary configuration that is associated with a given target secondary cell (PSCell) before Txxx expires, or if Txxx is not configured and if the secondary trigger conditions are fulfilled for a secondary configuration that is associated with a given target secondary cell (PSCell), the method may further comprise executing the handover according to the conditional handover configuration that is associated with the first and second configurations that fulfilled the first and second trigger conditions (i.e. apply the MCG configuration according to the first configuration and the SCG configuration according to the second configuration, perform random access to the Cell/PSCell, etc.).

On the other hand, if Txxx is configured and Txxx expires before the secondary trigger conditions are fulfilled for a secondary configuration that is associated with a given target secondary cell (PSCell), the method may comprise executing the handover according to the conditional handover configuration that is associated only with the first configurations that fulfilled the first trigger conditions (i.e. apply only the MCG configuration according to the first configuration, perform random access to the PCell, etc.).

FIG. 16 show that in some embodiments the method comprises transmitting an RRCReconfigurationComplete message (or similar, e.g. ConditionalReconfigurationComplete message) toward the target primary node/cell which fulfilled the first trigger condition (Step 1630). The message may optionally comprise the conditional configuration identifier associated with the executed first conditional handover configuration, if included. In some embodiments, if the trigger conditions for a secondary configuration associated with the first configuration were also fulfilled (i.e. Txxx was not configured or Txxx was configured but it didn't expire before the secondary trigger conditions were fulfilled), the method may comprise including an embedded RRCReconfigurationComplete message (or similar, e.g. ConditionalReconfigurationComplete message) toward the target secondary node/cell which fulfilled the second trigger condition. In this case, the message to the target secondary node/cell may optionally include the conditional configuration identifier associated with the executed second conditional handover configuration, if it was included in the CHO configuration. The message to the target secondary node/cell can be embedded in a (transparent) container inside the complete message to the target primary node/cell.

Network Embodiments

Figure 17:
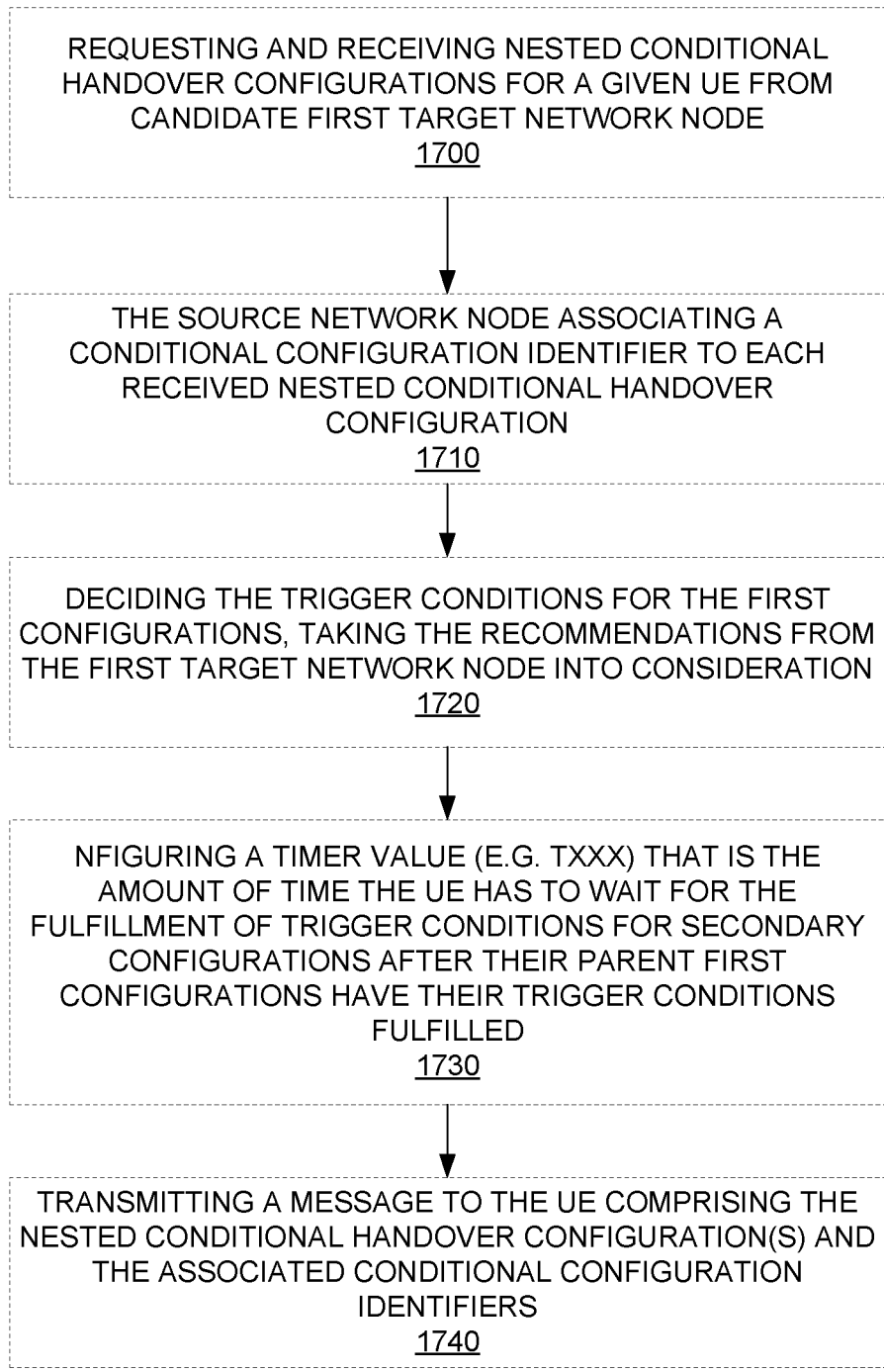
FIG. 17 is a logic flow diagram of a method performed by a source network node according to some embodiments.
Figure 20:
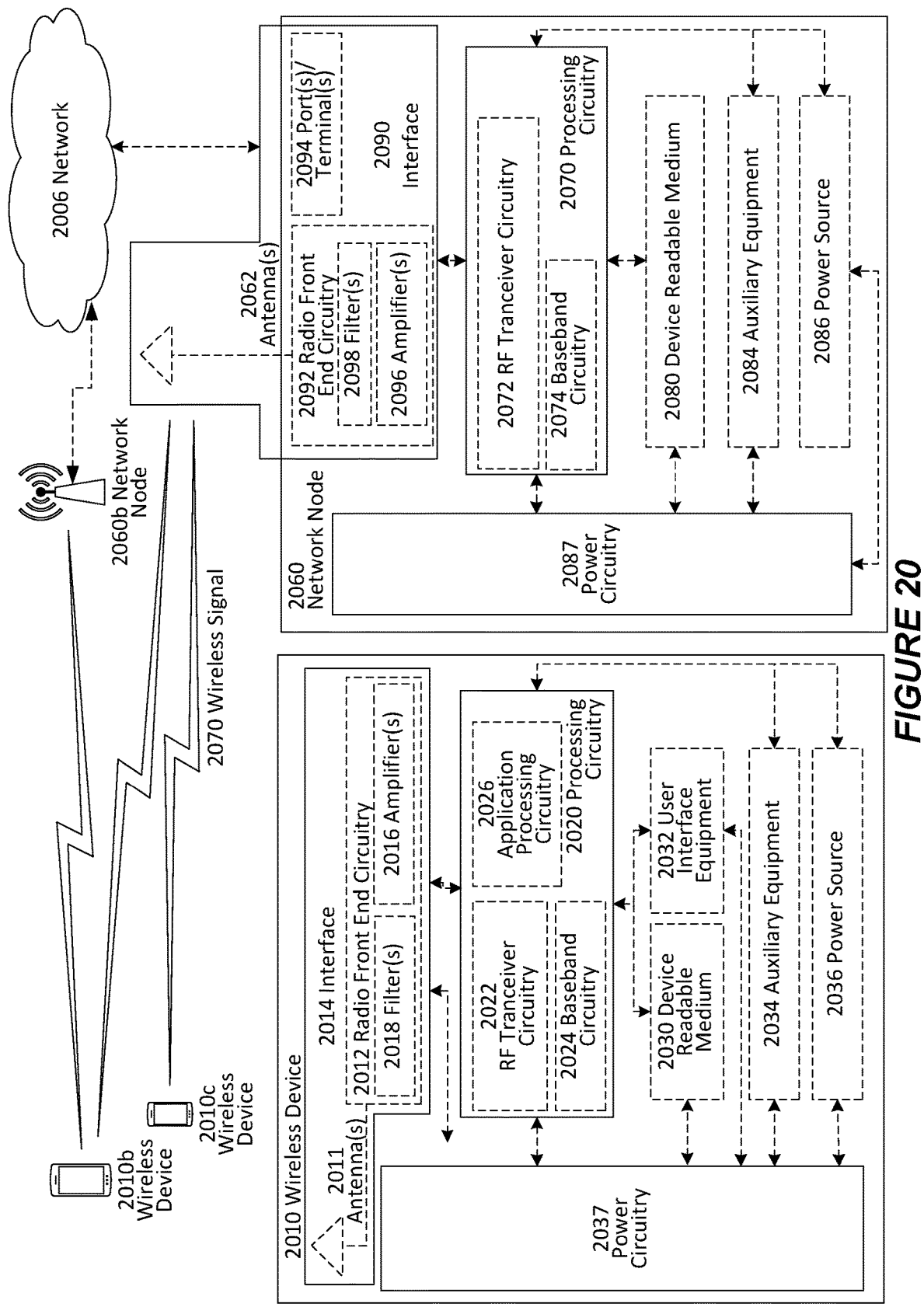
FIG. 20 is a block diagram of a wireless communication network according to some embodiments.

Some embodiments comprise a method at a source network node for configuring a user equipment for nested conditional handover execution. The method in some embodiments comprises one or more steps as shown in FIG. 20. The method in FIG. 17 may be seen as a specific example of the method in FIG. 3, or may be implemented separate and apart from the method in FIG. 3.

In some embodiments, the method comprises requesting and receiving nested conditional handover configurations for a given UE from candidate first target network node (Step 1700). In some embodiments, a nested conditional configuration for handling conditional handover execution contains a first and second set of configurations. Here, a first set of configurations have associated trigger conditions to determine the most suitable target master node and associated cell group (MCG). A second set of configurations have associated trigger conditions, where each second configuration is associated with at least one first set configuration, to be checked only after the trigger conditions for the associated first set configuration are fulfilled, to determine the most suitable target secondary node and associated secondary cell group (SCG).

In some embodiments, each nested CHO configurations from the candidate target network node contains at least one first configuration that is an MCG configuration and where the PCell is being served by the candidate first target node. Each nested CHO configuration may also contain one or more second configurations associated with each first configuration, which is related to an SCG configuration, where the PSCell is being served by a candidate second target network node.

In some embodiments, the first configurations received from the first candidate target node may contain proposed trigger conditions for the configuration(s) (e.g. relative or absolute conditions) and the source network node may take these into account. There can be only one first configuration from a first target node, or there can be multiple first configurations from a first target node but each having a unique target primary cell, or there can be multiple first set configuration from a first target node that are associated with a given primary cell.

The second configurations, which are associated with the first configurations, received from the first candidate target node contain the trigger conditions for the second configuration(s) (e.g. relative or absolute conditions). There can be only one second configuration for each first configuration or from a first target node or there can be multiple second configurations associated with a given first configuration. When there are multiple second configurations, there could be only one second configuration associated with a given second target network node or there could be multiple second configurations associated with a given second target network node but each having a unique target primary secondary cell or there could be multiple second configurations associated with a given target primary secondary cell of a second target network node.

The nested conditional handover configuration(s) from the candidate first target network node may comprise conditional configuration identifier(s) for each nested conditional handover configuration.

In some embodiments, the method comprises the source network node associating a conditional configuration identifier to each received nested conditional handover configuration (Step 1710). In one embodiment, the identifiers are determined implicitly (e.g. first configuration gets identity=1, second one gets identity=2, etc.). Or, in another embodiment, the source network node decides unique identities and indicates to the target first network node the assigned configuration identifier for the corresponding handover configuration.

In some embodiments, the method comprises deciding the trigger conditions for the first configurations, taking the recommendations from the first target network node into consideration (Step ZZ0120).

In some embodiments, the method comprises configuring a timer value (e.g. Txxx) that is the amount of time the UE has to wait for the fulfillment of trigger conditions for secondary configurations after their parent first configurations have their trigger conditions fulfilled (Step 1730). This could be the same for all nested CHO configurations or different for each. The source network node can communicate this to the UE either via dedicated signaling or broadcast signaling (broadcast signaling applies only when a common timer is to be used for all nested CHO configuration, but this can be overridden by dedicated configuration in each CHO configuration). The Txxx value can solely be decided by the source node, or based on recommendation/ information from the first target node.

In some embodiments, the method comprises transmitting a message to the UE comprising the nested conditional handover configuration(s) and the associated conditional configuration identifiers (Step 1740).

In some embodiments, the method comprises one or more steps upon receiving an indication that the UE has executed a handover to a candidate first target network node (e.g. via X2/Xn signaling or from the CN via S1/NG signaling). If the UE was in dual connectivity with the source node and another source secondary node before the execution of the handover, the one or more steps may include transmitting a message to the source secondary node (e.g. SN release message) to release the UE context/resources at the source secondary node. In some embodiments, the one or more steps may include, for each candidate first target network node except the one in which the UE executed the CHO, transmitting a single message to release the UE context/ resources associated with all CHO configurations for that UE or transmitting one message per CHO configuration, comprising the conditional configuration identifier, to each candidate target network node to release the UE context/ resources.

Figure 18A:
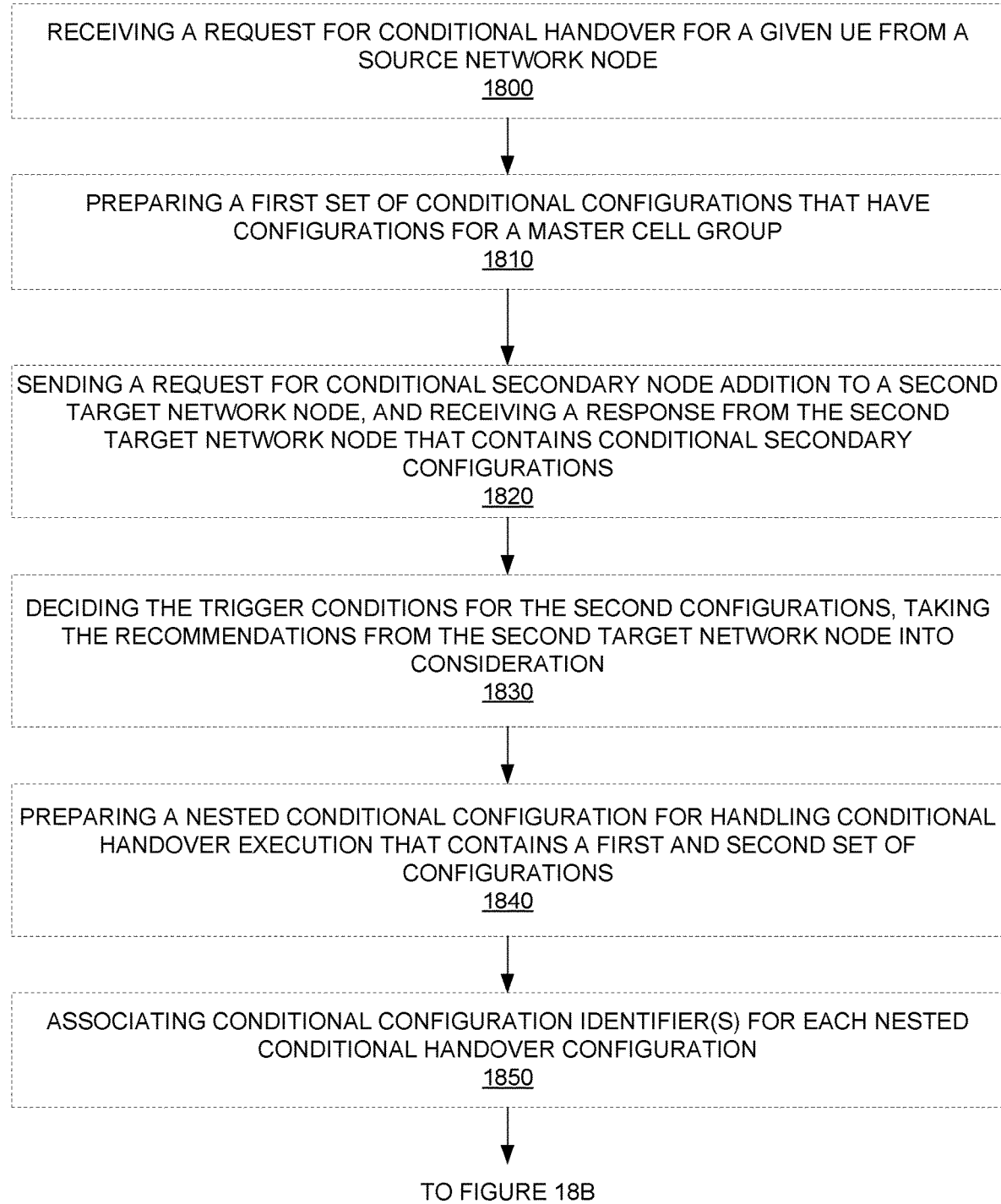
FIGS. 18A-18B are logic flow diagrams of a method performed by a first target network node according to some embodiments.
Figure 18B:
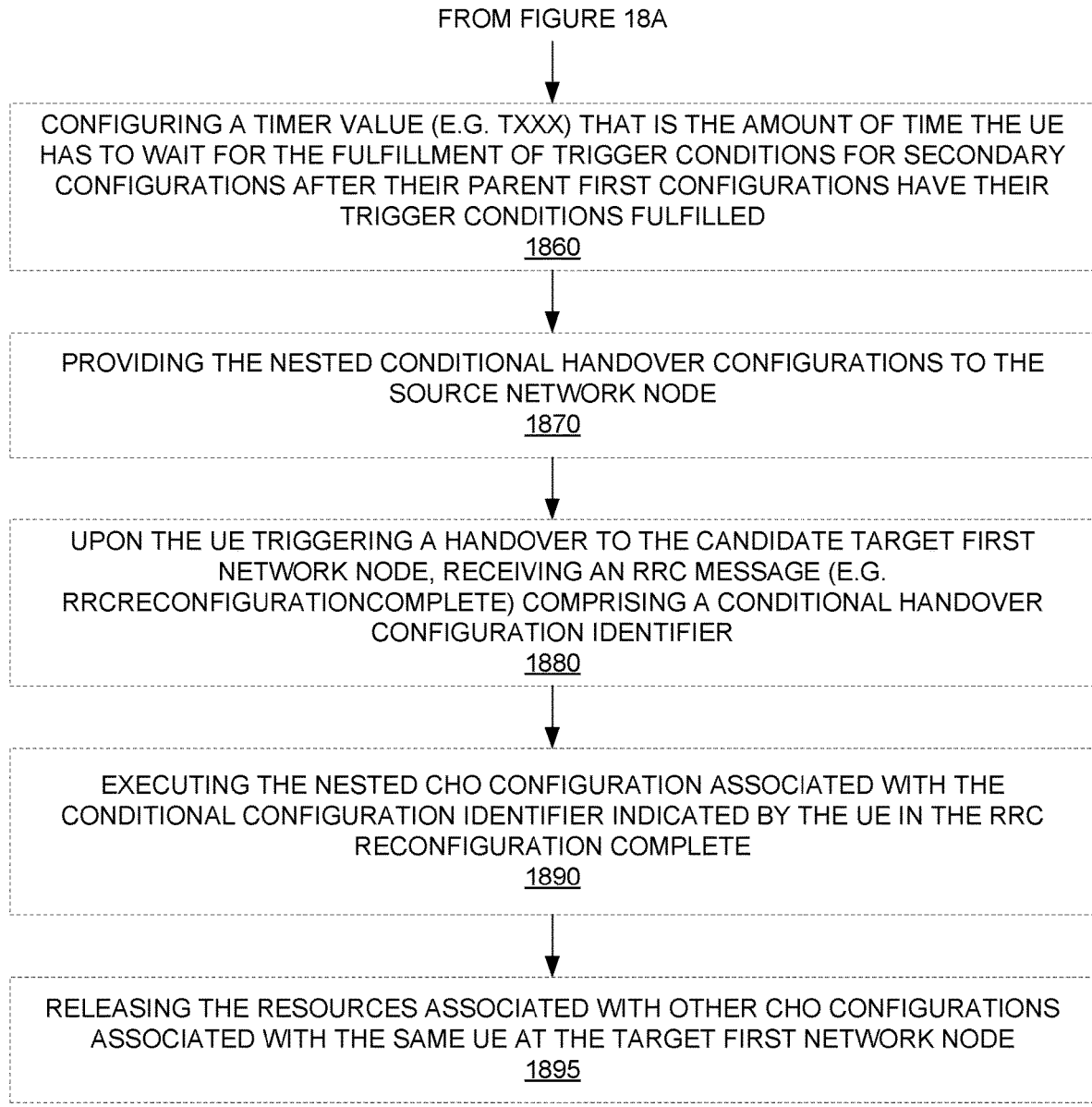

Some embodiments comprise a method at a first target network node for configuring a user equipment for nested conditional handover execution. As shown in FIGS. 18A and 18B, the method comprising one or more steps. The method in FIGS. 18A and 18B may be seen as a specific example of the method in FIG. 5, or may be implemented separate and apart from the method in FIG. 5.

As shown in FIGS. 18A and 18B, the method may comprise receiving a request for conditional handover for a given UE from a source network node (Step 2100).

In some embodiments, the method may comprise preparing a first set of conditional configurations that have configurations for a master cell group (Step 2110). The conditional configurations may contain proposed trigger conditions for the configuration(s) (e.g. relative or absolute conditions) and the source network node may take these into account. There can be only one conditional configuration from the first target node, or there can be multiple configurations from the first target node but each having a unique target primary cell, or there can be multiple conditional configurations from the first target node that are associated with a given primary cell. Regardless, the method may comprise sending a request for conditional secondary node addition to a second target network node, and receiving a response from the second target network node that contains conditional secondary configurations (Step 2120). The conditional secondary configurations received from the second target node may contain proposed trigger conditions for the configuration(s) (e.g. relative or absolute conditions) and the first target network node may take these into account. There can be only one conditional secondary configuration from a second target node, or there can be multiple secondary configurations from a second target node but each having a unique target primary secondary cell, or there can be multiple conditional secondary configuration from a second target node that are associated with a given primary secondary cell.

The method in some embodiments comprises deciding the trigger conditions for the second configurations, taking the recommendations from the second target network node into consideration (Step 2130). The method may comprise preparing a nested conditional configuration for handling conditional handover execution that contains a first and second set of configurations (Step 2140). The first set of configurations have associated recommended trigger conditions to determine the most suitable primary cell and master cell group, where each cell in the configuration belongs to the first target network node. The second set of configurations have trigger conditions, where each second configuration is associated with at least one first set configuration, to be checked only after the trigger conditions for the associated first set configuration are fulfilled, to determine the most suitable primary secondary cell and secondary cell group. Each cell in the configuration belongs to the second target network node.

The method may comprise associating conditional configuration identifier(s) for each nested conditional handover configuration (Step 1850).

In some embodiments, the method comprises configuring a timer value (e.g. Txxx) that is the amount of time the UE has to wait for the fulfillment of trigger conditions for secondary configurations after their parent first configurations have their trigger conditions fulfilled (Step 1860). This could be the same for all nested CHO configurations or different for each. The first target network node can communicate this to the source node or it can use broadcast signaling (the broadcast signaling applies only when a common timer is to be used for all nested CHO configuration, and the UEs will use the broadcasted value in the target cell when evaluating second configurations that are associated with a first configuration that includes a cell in the first target network node, unless it is overridden by dedicated configuration in each CHO configuration).

In some embodiments, the method comprises providing the nested conditional handover configurations to the source network node (Step 1870).

In some embodiments, upon the UE triggering a handover to the candidate target first network node, the method comprises receiving an RRC message (e.g. RRCReconfigurationComplete) comprising a conditional handover configuration identifier (Step 1880).

In some embodiments, the method comprises executing the nested CHO configuration associated with the conditional configuration identifier indicated by the UE in the RRC Reconfiguration complete (including performing a path switch request to the core network which will instruct the source network node to release the UE context/resources) (Step 1890). If the UE has executed also a secondary configuration associated with a first configuration (which the target first node can determine, for example, by checking if there is an embedded RRC message towards a secondary target node in the message it has received from the UE), the method may comprise executing the conditional configuration involves the sending of information (e.g. via X2/Xn signaling or from the CN via 1/NG signaling) to the second target node that is associated with the first configuration that is part of the nested CHO configuration that is being executed. This information could be just the transparent forwarding of an acknowledgement message from the UE regarding the proper setup of an SCG (e.g. RRCReconfigurationComplete).

For each candidate second target network node with which the first network node has prepared nested CHO configuration for the UE, except the one that was associated with the first configuration that is part of the nested CHO configuration that is being executed (i.e. if UE has executed a secondary configuration towards a secondary target, no need to send a release message to that node), the method may comprise transmitting a single message (e.g. via X2/Xn signaling or from the CN via S1/NG signaling) to release the UE context/resources associated with all secondary CHO configurations for that UE. Or, transmitting one message per CHO configuration, comprising the conditional configuration identifier for the secondary configuration, to each candidate second target network node to release the UE context/resources.

In some embodiments, the method comprises releasing the resources associated with other CHO configurations associated with the same UE at the target first network node (Step 1895). If the first target network node is not the one selected by the UE for the handover, the method may comprise receiving a message from the source network node to release all CHO configurations, and releasing all resources/CHO configurations associated with the UE. Or, the method may comprise receiving one or more messages from the source network node comprising a conditional configuration identifier, indicating to release a specific CHO configuration, and releasing the resources/CHO configurations associated with the UE as indicated by the conditional configuration identifier.

In some embodiments, for each candidate second target network node with which the first target network node has prepared nested CHO configuration for the UE, the method may comprise transmitting a single message (e.g. via X2/Xn signaling or from the CN via S1/NG signaling) to release the UE context/resources associated with all secondary CHO configurations for that UE. Or, transmitting one message per CHO configuration, comprising the conditional configuration identifier for the secondary configuration, to each candidate second target network node to release the UE context/resources.

Figure 19:
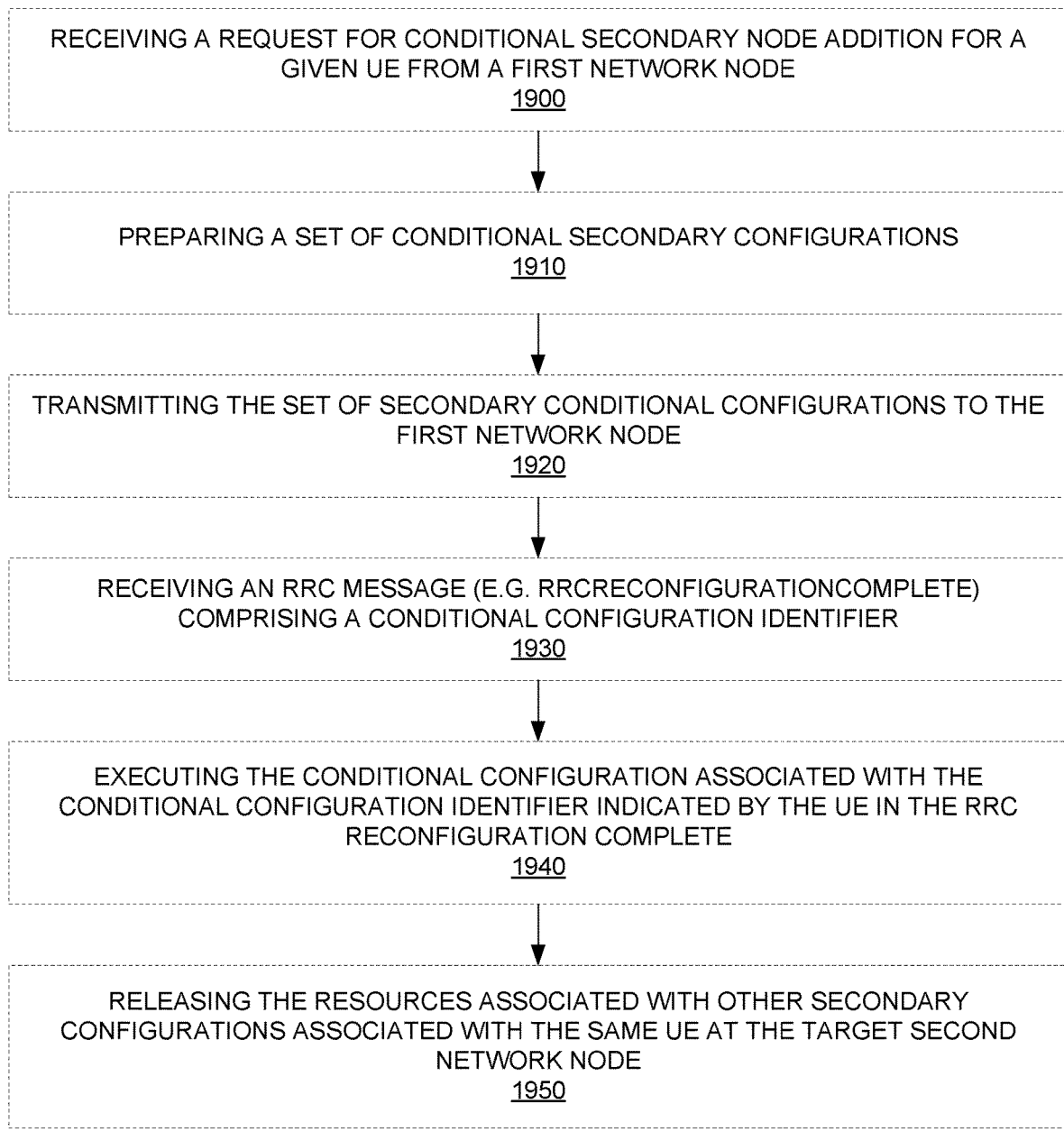
FIG. 19 is a logic flow diagram of a method performed by a second target network node according to some embodiments.

Some embodiments comprise a method at a second target network node for configuring a user equipment for nested conditional handover execution. The method comprising one or more steps as shown in FIG. 19. The method in FIG. 19 may be seen as a specific example of the method in FIG. 4, or may be implemented separate and apart from the method in FIG. 4.

As shown in FIG. 19, the method may comprise receiving a request for conditional secondary node addition for a given UE from a first network node (Step 1900).

The method may comprise preparing a set of conditional secondary configurations (Step 1910). The conditional secondary configurations may contain proposed trigger conditions for the configuration(s) (e.g. relative or absolute conditions) and the first target network node may take these into account. There can be only one conditional secondary configuration from the second target node, or there can be multiple secondary configurations from the second target node but each having a unique target primary secondary cell, or there can be multiple conditional secondary configuration from the second target node that are associated with a given primary secondary cell.

In some embodiments, the method comprises transmitting the set of secondary conditional configurations to the first network node (Step 1920).

In some embodiments, upon the UE triggering a handover according to a nested CHO configuration that has a secondary configuration associated with the second target network node, the method comprises receiving an RRC message (e.g. RRCReconfigurationComplete) comprising a conditional configuration identifier (Step 1930).

In some embodiments, the method comprises executing the conditional configuration associated with the conditional configuration identifier indicated by the UE in the RRC Reconfiguration complete (Step 1940).

In some embodiments, the method comprises releasing the resources associated with other secondary configurations associated with the same UE at the target second network node (Step 1950).

If the second target network node is not the secondary node associated with the CHO that the UE has executed, the method may comprise receiving a message from the source network node to release all CHO configurations, and releasing all resources/CHO configurations associated with the UE. Or, the method may comprise receiving one or more messages from the source network node comprising a conditional configuration identifier, indicating to release a specific CHO configuration, and releasing the resources/CHO configurations associated with the UE as indicated by the conditional configuration identifier.

Note that embodiments herein are related to conditional configurations. A conditional configuration may in some embodiments be associated with a handover procedure, but the embodiments may generally be applicable both to the case when the conditional configuration is associated with a handover and when the conditional configuration is not. So if, in the description of some embodiment, the term conditional handover is used, it should not be understood as limiting but just an example, i.e. the embodiment could also be applicable to cases when the conditional configuration is not associated with a handover.

In some embodiments described herein, it is described how the UE receives multiple conditional handover (CHO) configurations for one or more target nodes and/or cells and how the UE receives configuration identifiers which the UE uses in such scenarios. Also, there are methods described for source and target nodes. However, it should be noted that some of the embodiments described herein can also be applied to intra-node/intra-cell scenarios as well, i.e. scenarios in which the UE applies a conditional configuration for the same node as the UE is connected to; namely scenarios where a node A sends conditional configurations to the UE which applies for node A itself. In intra-node/intra-cell scenarios, the methods which are described to be applied by the "source node" or "target node" may take place within the single node.

Most of the embodiments are describing the handling in case of NR. However, it should be noted that this is only for the sake of brevity and the methods are applicable also to the case of LTE. As such, the enhancements referred to NR here in RRCReconfiguration, ConditionalRRCReconfiguration, RRCReconfigurationComplete, etc. are applicable to the LTE equivalents of RRCConnectionReconfiguration, ConditionalRRCConnectionReconfiguration, RRCConnectionReconfigurationComplete, etc.

As used herein, the first candidate target network node refers to a network node that is the target MN in one of the nested conditional handover configurations the UE is being configured with. The second candidate target network node refers to a network node that is the target SN in one of the nested conditional handover configurations the UE is being configured with.

For the sake of brevity, it is assumed herein that the trigger conditions for the first configuration remain fulfilled while checking for the trigger conditions for the second configuration. However, it is possible that may not be the case. If the trigger conditions for the first configuration are not fulfilled anymore for the first configuration while checking the trigger conditions for the second configurations associated with the first configuration, then the evaluation of the secondary configuration associated with the first configuration is stopped. Alternatively, the UE may keep checking only the secondary conditions, and when they are fulfilled, it re-checks if the first conditions are still fulfilled before executing the full nested CHO configuration.

If more than one first configuration has a trigger condition fulfilled, then the UE may evaluate the trigger conditions for the secondary configurations associated with all of the first configurations that have their trigger conditions fulfilled. Alternatively, only a certain number of the first configurations will be chosen, the limit being configured by the network or specified in the standards or based on UE implementation. A priority could also be included with each nested CHO configuration, and only those that are above a certain priority could be chosen when more than one first configuration have their trigger conditions fulfilled.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network 2006, network nodes 2060 and 2060*b*, and WDs 2010, 2010*b*, and 2010*c*. In practice, a wireless network may further include any additional elements suitable to support communication between wireless devices or between a wireless device and another communication device, such as a landline telephone, a service provider, or any other network node or end device. Of the illustrated components, network node 2060 and wireless device (WD) 2010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2060 and WD 2010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node 2060 includes processing circuitry 2070, device readable medium 2080, interface 2090, auxiliary equipment 2084, power source 2086, power circuitry 2087, and antenna 2062. Although network node 2060 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2060 are depicted as single boxes located within a larger box, or nested within multiple boxes, in practice, a network node may comprise multiple different physical components that make up a single illustrated component (e.g., device readable medium 2080 may comprise multiple separate hard drives as well as multiple RAM modules).

Similarly, network node 2060 may be composed of multiple physically separate components (e.g., a NodeB component and a RNC component, or a BTS component and a BSC component, etc.), which may each have their own respective components. In certain scenarios in which network node 2060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2060 may be configured to support multiple radio access technologies (RATs). In such embodiments, some components may be duplicated (e.g., separate device readable medium 2080 for the different RATs) and some components may be reused (e.g., the same antenna 2062 may be shared by the RATs). Network node 2060 may also include multiple sets of the various illustrated components for different wireless technologies integrated into network node 2060, such as, for example, GSM, WCDMA, LTE, NR, WiFi, or Bluetooth wireless technologies. These wireless technologies may be integrated into the same or different chip or set of chips and other components within network node 2060.

Processing circuitry 2070 is configured to perform any determining, calculating, or similar operations (e.g., certain obtaining operations) described herein as being provided by a network node. These operations performed by processing circuitry 2070 may include processing information obtained by processing circuitry 2070 by, for example, converting the obtained information into other information, comparing the obtained information or converted information to information stored in the network node, and/or performing one or more operations based on the obtained information or converted information, and as a result of said processing making a determination.

Processing circuitry 2070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2060 components, such as device readable medium 2080, network node 2060 functionality. For example, processing circuitry 2070 may execute instructions stored in device readable medium 2080 or in memory within processing circuitry 2070. Such functionality may include providing any of the various wireless features, functions, or benefits discussed herein. In some embodiments, processing circuitry 2070 may include a system on a chip (SOC).

In some embodiments, processing circuitry 2070 may include one or more of radio frequency (RF) transceiver circuitry 2072 and baseband processing circuitry 2074. In some embodiments, radio frequency (RF) transceiver circuitry 2072 and baseband processing circuitry 2074 may be on separate chips (or sets of chips), boards, or units, such as radio units and digital units. In alternative embodiments, part or all of RF transceiver circuitry 2072 and baseband processing circuitry 2074 may be on the same chip or set of chips, boards, or units In certain embodiments, some or all of the functionality described herein as being provided by a network node, base station, eNB or other such network device may be performed by processing circuitry 2070 executing instructions stored on device readable medium 2080 or memory within processing circuitry 2070. In alternative embodiments, some or all of the functionality may be provided by processing circuitry 2070 without executing instructions stored on a separate or discrete device readable medium, such as in a hard-wired manner. In any of those embodiments, whether executing instructions stored on a device readable storage medium or not, processing circuitry 2070 can be configured to perform the described functionality. The benefits provided by such functionality are not limited to processing circuitry 2070 alone or to other components of network node 2060, but are enjoyed by network node 2060 as a whole, and/or by end users and the wireless network generally.

Device readable medium 2080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2070. Device readable medium 2080 may store any suitable instructions, data or information, including a computer program, software, an application including one or more of logic, rules, code, tables, etc. and/or other instructions capable of being executed by processing circuitry 2070 and, utilized by network node 2060. Device readable medium 2080 may be used to store any calculations made by processing circuitry 2070 and/or any data received via interface 2090. In some embodiments, processing circuitry 2070 and device readable medium 2080 may be considered to be integrated.

Interface 2090 is used in the wired or wireless communication of signalling and/or data between network node 2060, network 2006, and/or WDs 2010. As illustrated, interface 2090 comprises port(s)/terminal(s) 2094 to send and receive data, for example to and from network 2006 over a wired connection. Interface 2090 also includes radio front end circuitry 2092 that may be coupled to, or in certain embodiments a part of, antenna 2062. Radio front end circuitry 2092 comprises filters 2098 and amplifiers 2096. Radio front end circuitry 2092 may be connected to antenna 2062 and processing circuitry 2070. Radio front end circuitry may be configured to condition signals communicated between antenna 2062 and processing circuitry 2070. Radio front end circuitry 2092 may receive digital data that is to be sent out to other network nodes or WDs via a wireless connection. Radio front end circuitry 2092 may convert the digital data into a radio signal having the appropriate channel and bandwidth parameters using a combination of filters 2098 and/or amplifiers 2096. The radio signal may then be transmitted via antenna 2062. Similarly, when receiving data, antenna 2062 may collect radio signals which are then converted into digital data by radio front end circuitry 2092. The digital data may be passed to processing circuitry 2070. In other embodiments, the interface may comprise different components and/or different combinations of components.

In certain alternative embodiments, network node 2060 may not include separate radio front end circuitry 2092, instead, processing circuitry 2070 may comprise radio front end circuitry and may be connected to antenna 2062 without separate radio front end circuitry 2092. Similarly, in some embodiments, all or some of RF transceiver circuitry 2072 may be considered a part of interface 2090. In still other embodiments, interface 2090 may include one or more ports or terminals 2094, radio front end circuitry 2092, and RF transceiver circuitry 2072, as part of a radio unit (not shown), and interface 2090 may communicate with baseband processing circuitry 2074, which is part of a digital unit (not shown).

Antenna 2062 may include one or more antennas, or antenna arrays, configured to send and/or receive wireless signals. Antenna 2062 may be coupled to radio front end circuitry 2090 and may be any type of antenna capable of transmitting and receiving data and/or signals wirelessly. In some embodiments, antenna 2062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2062 may be separate from network node 2060 and may be connectable to network node 2060 through an interface or port.

Antenna 2062, interface 2090, and/or processing circuitry 2070 may be configured to perform any receiving operations and/or certain obtaining operations described herein as being performed by a network node. Any information, data and/or signals may be received from a wireless device, another network node and/or any other network equipment. Similarly, antenna 2062, interface 2090, and/or processing circuitry 2070 may be configured to perform any transmitting operations described herein as being performed by a network node. Any information, data and/or signals may be transmitted to a wireless device, another network node and/or any other network equipment.

Power circuitry 2087 may comprise, or be coupled to, power management circuitry and is configured to supply the components of network node 2060 with power for performing the functionality described herein. Power circuitry 2087 may receive power from power source 2086. Power source 2086 and/or power circuitry 2087 may be configured to provide power to the various components of network node 2060 in a form suitable for the respective components (e.g., at a voltage and current level needed for each respective component). Power source 2086 may either be included in, or external to, power circuitry 2087 and/or network node 2060. For example, network node 2060 may be connectable to an external power source (e.g., an electricity outlet) via an input circuitry or interface such as an electrical cable, whereby the external power source supplies power to power circuitry 2087. As a further example, power source 2086 may comprise a source of power in the form of a battery or battery pack which is connected to, or integrated in, power circuitry 2087. The battery may provide backup power should the external power source fail. Other types of power sources, such as photovoltaic devices, may also be used.

Alternative embodiments of network node 2060 may include additional components beyond those shown in FIG. 20 that may be responsible for providing certain aspects of the network node's functionality, including any of the functionality described herein and/or any functionality necessary to support the subject matter described herein. For example, network node 2060 may include user interface equipment to allow input of information into network node 2060 and to allow output of information from network node 2060. This may allow a user to perform diagnostic, maintenance, repair, and other administrative functions for network node 2060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2010 includes antenna 2011, interface 2014, processing circuitry 2020, device readable medium 2030, user interface equipment 2032, auxiliary equipment 2034, power source 2036 and power circuitry 2037. WD 2010 may include multiple sets of one or more of the illustrated components for different wireless technologies supported by WD 2010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2010.

Antenna 2011 may include one or more antennas or antenna arrays, configured to send and/or receive wireless signals, and is connected to interface 2014. In certain alternative embodiments, antenna 2011 may be separate from WD 2010 and be connectable to WD 2010 through an interface or port. Antenna 2011, interface 2014, and/or processing circuitry 2020 may be configured to perform any receiving or transmitting operations described herein as being performed by a WD. Any information, data and/or signals may be received from a network node and/or another WD. In some embodiments, radio front end circuitry and/or antenna 2011 may be considered an interface.

As illustrated, interface 2014 comprises radio front end circuitry 2012 and antenna 2011. Radio front end circuitry 2012 comprise one or more filters 2018 and amplifiers 2016. Radio front end circuitry 2014 is connected to antenna 2011 and processing circuitry 2020, and is configured to condition signals communicated between antenna 2011 and processing circuitry 2020. Radio front end circuitry 2012 may be coupled to or a part of antenna 2011. In some embodiments, WD 2010 may not include separate radio front end circuitry 2012; rather, processing circuitry 2020 may comprise radio front end circuitry and may be connected to antenna 2011. Similarly, in some embodiments, some or all of RF transceiver circuitry 2022 may be considered a part of interface 2014. Radio front end circuitry 2012 may receive digital data that is to be sent out to other network nodes or WDs via a wireless connection. Radio front end circuitry 2012 may convert the digital data into a radio signal having the appropriate channel and bandwidth parameters using a combination of filters 2018 and/or amplifiers 2016. The radio signal may then be transmitted via antenna 2011. Similarly, when receiving data, antenna 2011 may collect radio signals which are then converted into digital data by radio front end circuitry 2012. The digital data may be passed to processing circuitry 2020. In other embodiments, the interface may comprise different components and/or different combinations of components.

Processing circuitry 2020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2010 components, such as device readable medium 2030, WD 2010 functionality. Such functionality may include providing any of the various wireless features or benefits discussed herein. For example, processing circuitry 2020 may execute instructions stored in device readable medium 2030 or in memory within processing circuitry 2020 to provide the functionality disclosed herein.

As illustrated, processing circuitry 2020 includes one or more of RF transceiver circuitry 2022, baseband processing circuitry 2024, and application processing circuitry 2026. In other embodiments, the processing circuitry may comprise different components and/or different combinations of components. In certain embodiments processing circuitry 2020 of WD 2010 may comprise a SOC. In some embodiments, RF transceiver circuitry 2022, baseband processing circuitry 2024, and application processing circuitry 2026 may be on separate chips or sets of chips. In alternative embodiments, part or all of baseband processing circuitry 2024 and application processing circuitry 2026 may be combined into one chip or set of chips, and RF transceiver circuitry 2022 may be on a separate chip or set of chips. In still alternative embodiments, part or all of RF transceiver circuitry 2022 and baseband processing circuitry 2024 may be on the same chip or set of chips, and application processing circuitry 2026 may be on a separate chip or set of chips. In yet other alternative embodiments, part or all of RF transceiver circuitry 2022, baseband processing circuitry 2024, and application processing circuitry 2026 may be combined in the same chip or set of chips. In some embodiments, RF transceiver circuitry 2022 may be a part of interface 2014. RF transceiver circuitry 2022 may condition RF signals for processing circuitry 2020.

In certain embodiments, some or all of the functionality described herein as being performed by a WD may be provided by processing circuitry 2020 executing instructions stored on device readable medium 2030, which in certain embodiments may be a computer-readable storage medium. In alternative embodiments, some or all of the functionality may be provided by processing circuitry 2020 without executing instructions stored on a separate or discrete device readable storage medium, such as in a hard-wired manner. In any of those particular embodiments, whether executing instructions stored on a device readable storage medium or not, processing circuitry 2020 can be configured to perform the described functionality. The benefits provided by such functionality are not limited to processing circuitry 2020 alone or to other components of WD 2010, but are enjoyed by WD 2010 as a whole, and/or by end users and the wireless network generally.

Processing circuitry 2020 may be configured to perform any determining, calculating, or similar operations (e.g., certain obtaining operations) described herein as being performed by a WD. These operations, as performed by processing circuitry 2020, may include processing information obtained by processing circuitry 2020 by, for example, converting the obtained information into other information, comparing the obtained information or converted information to information stored by WD 2010, and/or performing one or more operations based on the obtained information or converted information, and as a result of said processing making a determination.

Device readable medium 2030 may be operable to store a computer program, software, an application including one or more of logic, rules, code, tables, etc. and/or other instructions capable of being executed by processing circuitry 2020. Device readable medium 2030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2020. In some embodiments, processing circuitry 2020 and device readable medium 2030 may be considered to be integrated.

User interface equipment 2032 may provide components that allow for a human user to interact with WD 2010. Such interaction may be of many forms, such as visual, audial, tactile, etc. User interface equipment 2032 may be operable to produce output to the user and to allow the user to provide input to WD 2010. The type of interaction may vary depending on the type of user interface equipment 2032 installed in WD 2010. For example, if WD 2010 is a smart phone, the interaction may be via a touch screen; if WD 2010 is a smart meter, the interaction may be through a screen that provides usage (e.g., the number of gallons used) or a speaker that provides an audible alert (e.g., if smoke is detected). User interface equipment 2032 may include input interfaces, devices and circuits, and output interfaces, devices and circuits. User interface equipment 2032 is configured to allow input of information into WD 2010, and is connected to processing circuitry 2020 to allow processing circuitry 2020 to process the input information. User interface equipment 2032 may include, for example, a microphone, a proximity or other sensor, keys/buttons, a touch display, one or more cameras, a USB port, or other input circuitry. User interface equipment 2032 is also configured to allow output of information from WD 2010, and to allow processing circuitry 2020 to output information from WD 2010. User interface equipment 2032 may include, for example, a speaker, a display, vibrating circuitry, a USB port, a headphone interface, or other output circuitry. Using one or more input and output interfaces, devices, and circuits, of user interface equipment 2032, WD 2010 may communicate with end users and/or the wireless network, and allow them to benefit from the functionality described herein.

Auxiliary equipment 2034 is operable to provide more specific functionality which may not be generally performed by WDs. This may comprise specialized sensors for doing measurements for various purposes, interfaces for additional types of communication such as wired communications etc. The inclusion and type of components of auxiliary equipment 2034 may vary depending on the embodiment and/or scenario.

Power source 2036 may, in some embodiments, be in the form of a battery or battery pack. Other types of power sources, such as an external power source (e.g., an electricity outlet), photovoltaic devices or power cells, may also be used. WD 2010 may further comprise power circuitry 2037 for delivering power from power source 2036 to the various parts of WD 2010 which need power from power source 2036 to carry out any functionality described or indicated herein. Power circuitry 2037 may in certain embodiments comprise power management circuitry. Power circuitry 2037 may additionally or alternatively be operable to receive power from an external power source; in which case WD 2010 may be connectable to the external power source (such as an electricity outlet) via input circuitry or an interface such as an electrical power cable. Power circuitry 2037 may also in certain embodiments be operable to deliver power from an external power source to power source 2036. This may be, for example, for the charging of power source 2036. Power circuitry 2037 may perform any formatting, converting, or other modification to the power from power source 2036 to make the power suitable for the respective components of WD 2010 to which power is supplied.

Figure 21:
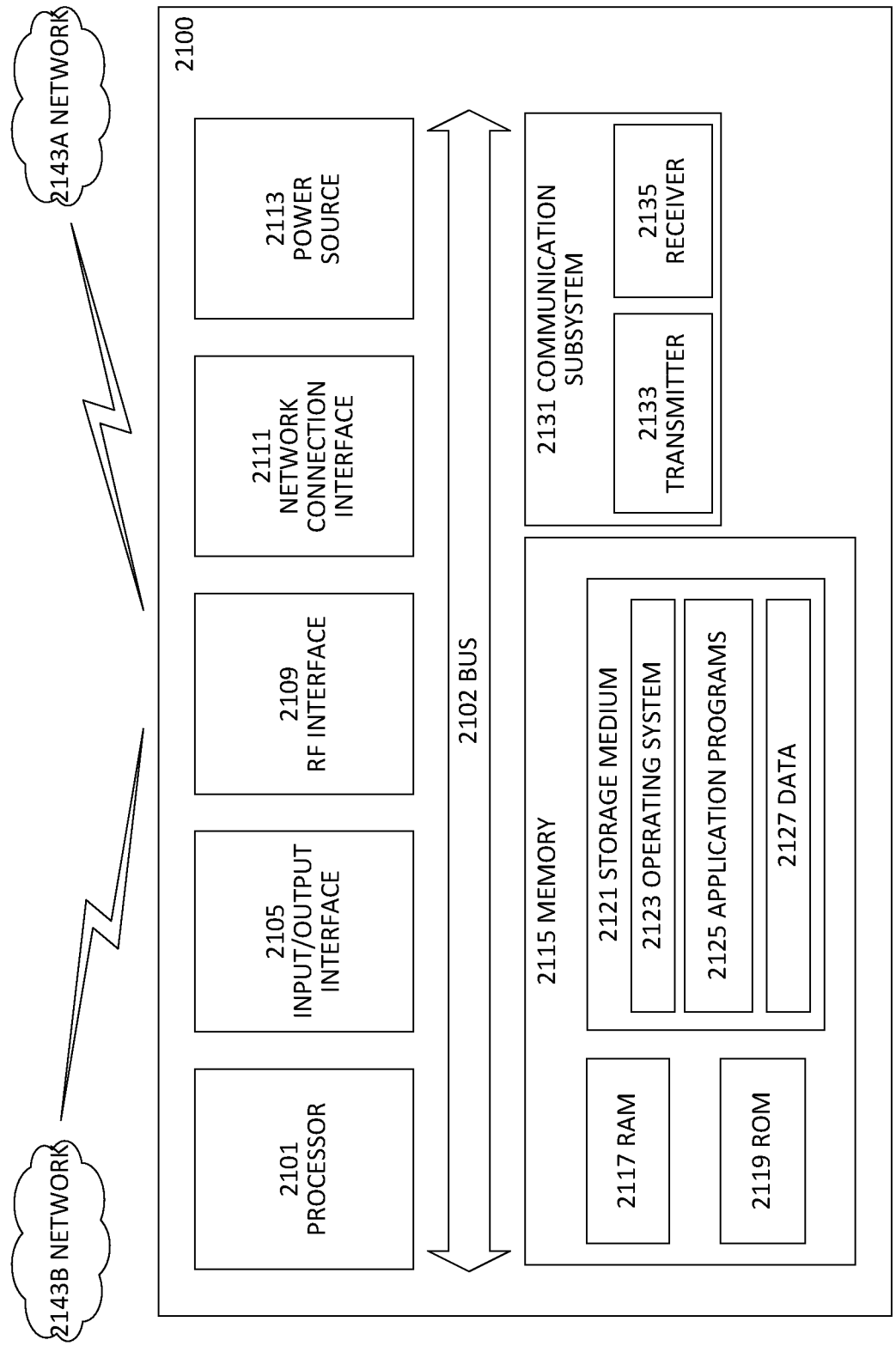
FIG. 21 is a block diagram of a user equipment according to some embodiments.

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 21200 may be any UE identified by the $3^{rd}$ Generation Partnership Project (3GPP), including a NB-IoT UE, a machine type communication (MTC) UE, and/or an enhanced MTC (eMTC) UE. UE 2100, as illustrated in FIG. 21, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE 2100 includes processing circuitry 2101 that is operatively coupled to input/output interface 2105, radio frequency (RF) interface 2109, network connection interface 2111, memory 2115 including random access memory (RAM) 2117, read-only memory (ROM) 2119, and storage medium 2121 or the like, communication subsystem 2131, power source 2133, and/or any other component, or any combination thereof. Storage medium 2121 includes operating system 2123, application program 2125, and data 2127. In other embodiments, storage medium 2121 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry 2101 may be configured to process computer instructions and data. Processing circuitry 2101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2101 may include two central processing units (CPUs). Data may be information in a form suitable for use by a computer.

In the depicted embodiment, input/output interface 2105 may be configured to provide a communication interface to an input device, output device, or input and output device. UE 2100 may be configured to use an output device via input/output interface 2105. An output device may use the same type of interface port as an input device. For example, a USB port may be used to provide input to and output from UE 2100. The output device may be a speaker, a sound card, a video card, a display, a monitor, a printer, an actuator, an emitter, a smartcard, another output device, or any combination thereof. UE 2100 may be configured to use an input device via input/output interface 2105 to allow a user to capture information into UE 2100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface 2109 may be configured to provide a communication interface to RF components such as a transmitter, a receiver, and an antenna. Network connection interface 2111 may be configured to provide a communication interface to network 2143a. Network 2143a may encompass wired and/or wireless networks such as a local-area network (LAN), a wide-area network (WAN), a computer network, a wireless network, a telecommunications network, another like network or any combination thereof. For example, network 2143a may comprise a Wi-Fi network. Network connection interface 2111 may be configured to include a receiver and a transmitter interface used to communicate with one or more other devices over a communication network according to one or more communication protocols, such as Ethernet, TCP/IP, SONET, ATM, or the like. Network connection interface 2111 may implement receiver and transmitter functionality appropriate to the communication network links (e.g., optical, electrical, and the like). The transmitter and receiver functions may share circuit components, software or firmware, or alternatively may be implemented separately.

RAM 2117 may be configured to interface via bus 2102 to processing circuitry 2101 to provide storage or caching of data or computer instructions during the execution of software programs such as the operating system, application programs, and device drivers. ROM 2119 may be configured to provide computer instructions or data to processing circuitry 2101. For example, ROM 2119 may be configured to store invariant low-level system code or data for basic system functions such as basic input and output (I/O), startup, or reception of keystrokes from a keyboard that are stored in a non-volatile memory. Storage medium 2121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2121 may be configured to include operating system 2123, application program 2125 such as a web browser application, a widget or gadget engine or another application, and data file 2127. Storage medium 2121 may store, for use by UE 2100, any of a variety of various operating systems or combinations of operating systems.

Storage medium 2121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2121 may allow UE 2100 to access computer-executable instructions, application programs or the like, stored on transitory or non-transitory memory media, to off-load data, or to upload data. An article of manufacture, such as one utilizing a communication system may be tangibly embodied in storage medium 2121, which may comprise a device readable medium.

In FIG. 21, processing circuitry 2101 may be configured to communicate with network 2143b using communication subsystem 2131. Network 2143a and network 2143b may be the same network or networks or different network or networks. Communication subsystem 2131 may be configured to include one or more transceivers used to communicate with network 2143b. For example, communication subsystem 2131 may be configured to include one or more transceivers used to communicate with one or more remote transceivers of another device capable of wireless communication such as another WD, UE, or base station of a radio access network (RAN) according to one or more communication protocols, such as IEEE 802.21, CDMA, WCDMA, GSM, LTE, UTRAN, WiMax, or the like. Each transceiver may include transmitter 2133 and/or receiver 2135 to implement transmitter or receiver functionality, respectively, appropriate to the RAN links (e.g., frequency allocations and the like). Further, transmitter 2133 and receiver 2135 of each transceiver may share circuit components, software or firmware, or alternatively may be implemented separately.

In the illustrated embodiment, the communication functions of communication subsystem 2131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2131 may include cellular communication, Wi-Fi communication, Bluetooth communication, and GPS communication. Network 2143b may encompass wired and/or wireless networks such as a local-area network (LAN), a wide-area network (WAN), a computer network, a wireless network, a telecommunications network, another like network or any combination thereof. For example, network 2143b may be a cellular network, a Wi-Fi network, and/or a near-field network. Power source 2113 may be configured to provide alternating current (AC) or direct current (DC) power to components of UE 2100.

The features, benefits and/or functions described herein may be implemented in one of the components of UE 2100 or partitioned across multiple components of UE 2100. Further, the features, benefits, and/or functions described herein may be implemented in any combination of hardware, software or firmware. In one example, communication subsystem 2131 may be configured to include any of the components described herein. Further, processing circuitry 2101 may be configured to communicate with any of such components over bus 2102. In another example, any of such components may be represented by program instructions stored in memory that when executed by processing circuitry 2101 perform the corresponding functions described herein. In another example, the functionality of any of such components may be partitioned between processing circuitry 2101 and communication subsystem 2131. In another example, the non-computationally intensive functions of any of such components may be implemented in software or firmware and the computationally intensive functions may be implemented in hardware.

Figure 22:
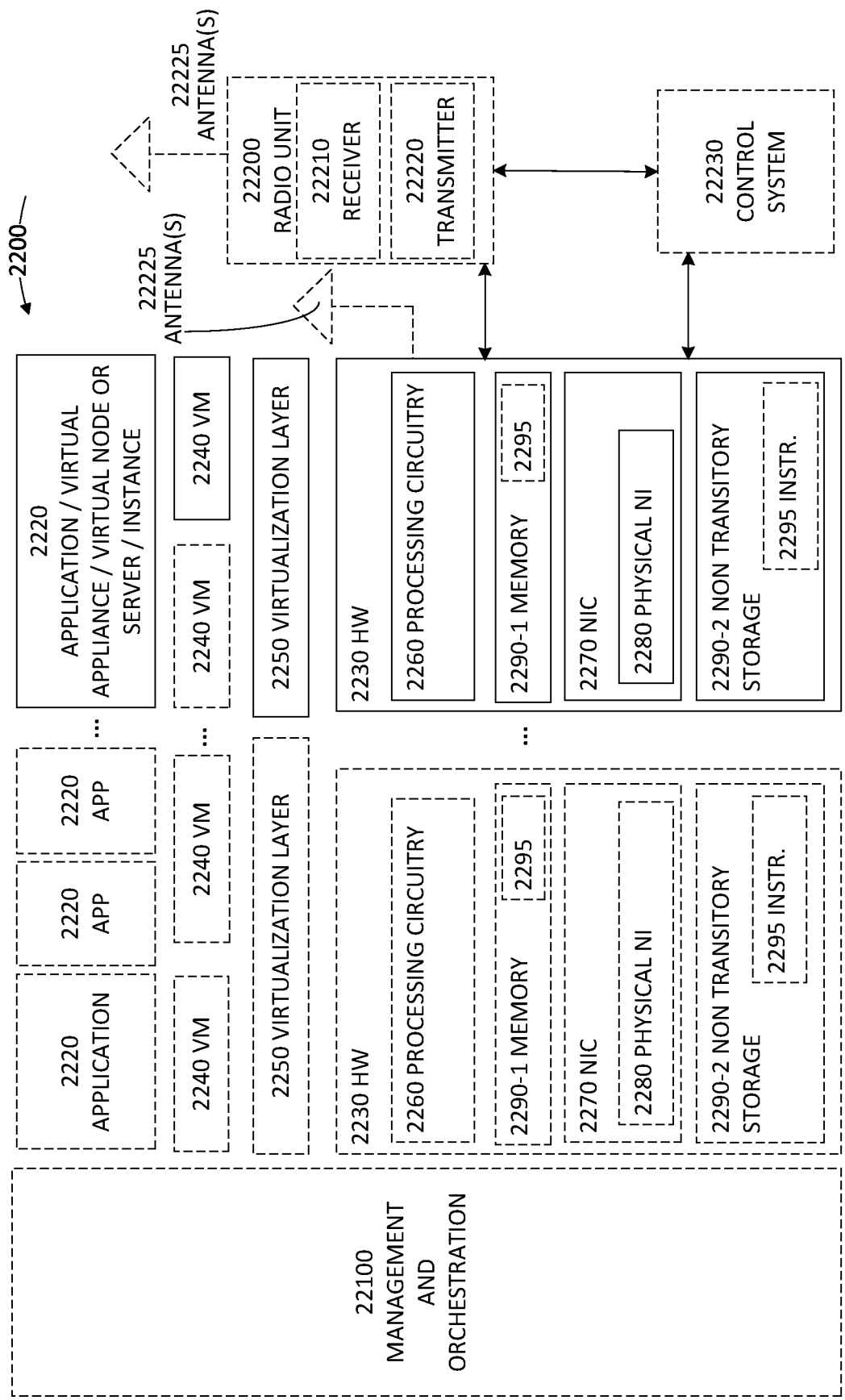
FIG. 22 is a block diagram of a virtualization environment according to some embodiments.

FIG. 22 is a schematic block diagram illustrating a virtualization environment 2200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2200 hosted by one or more of hardware nodes 2230. Further, in embodiments in which the virtual node is not a radio access node or does not require radio connectivity (e.g., a core network node), then the network node may be entirely virtualized.

The functions may be implemented by one or more applications 2220 (which may alternatively be called software instances, virtual appliances, network functions, virtual nodes, virtual network functions, etc.) operative to implement some of the features, functions, and/or benefits of some of the embodiments disclosed herein. Applications 2220 are run in virtualization environment 2200 which provides hardware 2230 comprising processing circuitry 2260 and memory 2290. Memory 2290 contains instructions 2295 executable by processing circuitry 2260 whereby application 2220 is operative to provide one or more of the features, benefits, and/or functions disclosed herein.

Virtualization environment 2200, comprises general-purpose or special-purpose network hardware devices 2230 comprising a set of one or more processors or processing circuitry 2260, which may be commercial off-the-shelf (COTS) processors, dedicated Application Specific Integrated Circuits (ASICs), or any other type of processing circuitry including digital or analog hardware components or special purpose processors. Each hardware device may comprise memory 2290-1 which may be non-persistent memory for temporarily storing instructions 2295 or software executed by processing circuitry 2260. Each hardware device may comprise one or more network interface controllers (NICs) 2270, also known as network interface cards, which include physical network interface 2280. Each hardware device may also include non-transitory, persistent, machine-readable storage media 2290-2 having stored therein software 2295 and/or instructions executable by processing circuitry 2260. Software 2295 may include any type of software including software for instantiating one or more virtualization layers 2250 (also referred to as hypervisors), software to execute virtual machines 2240 as well as software allowing it to execute functions, features and/or benefits described in relation with some embodiments described herein.

Virtual machines 2240, comprise virtual processing, virtual memory, virtual networking or interface and virtual storage, and may be run by a corresponding virtualization layer 2250 or hypervisor. Different embodiments of the instance of virtual appliance 2220 may be implemented on one or more of virtual machines 2240, and the implementations may be made in different ways.

During operation, processing circuitry 2260 executes software 2295 to instantiate the hypervisor or virtualization layer 2250, which may sometimes be referred to as a virtual machine monitor (VMM). Virtualization layer 2250 may present a virtual operating platform that appears like networking hardware to virtual machine 2240.

As shown in FIG. 22, hardware 2230 may be a standalone network node with generic or specific components. Hardware 2230 may comprise antenna 22225 and may implement some functions via virtualization. Alternatively, hardware 2230 may be part of a larger cluster of hardware (e.g. such as in a data center or customer premise equipment (CPE)) where many hardware nodes work together and are managed via management and orchestration (MANO) 22100, which, among others, oversees lifecycle management of applications 2220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2240 may be a software implementation of a physical machine that runs programs as if they were executing on a physical, non-virtualized machine. Each of virtual machines 2240, and that part of hardware 2230 that executes that virtual machine, be it hardware dedicated to that virtual machine and/or hardware shared by that virtual machine with others of the virtual machines 2240, forms a separate virtual network elements (VNE).

Still in the context of NFV, Virtual Network Function (VNF) is responsible for handling specific network functions that run in one or more virtual machines 2240 on top of hardware networking infrastructure 2230 and corresponds to application 2220 in FIG. 22.

In some embodiments, one or more radio units 22200 that each include one or more transmitters 22220 and one or more receivers 22210 may be coupled to one or more antennas 22225. Radio units 22200 may communicate directly with hardware nodes 2230 via one or more appropriate network interfaces and may be used in combination with the virtual components to provide a virtual node with radio capabilities, such as a radio access node or a base station.

In some embodiments, some signalling can be effected with the use of control system 22230 which may alternatively be used for communication between the hardware nodes 2230 and radio units 22200.

Figure 23:
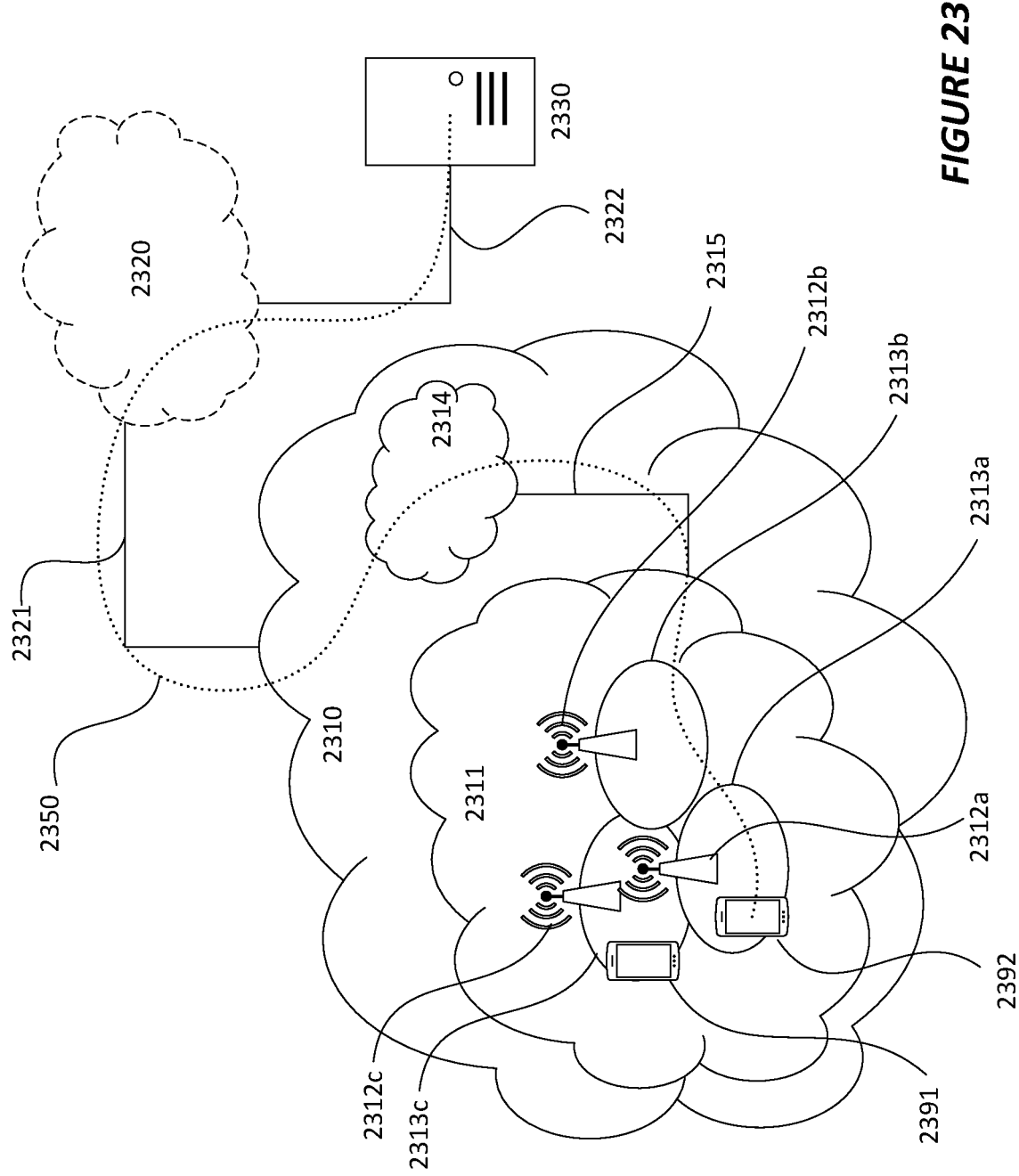
FIG. 23 is a block diagram of a communication network with a host computer according to some embodiments.

FIG. 23 illustrates a telecommunication network connected via an intermediate network to a host computer in accordance with some embodiments. In particular, with reference to FIG. 23, in accordance with an embodiment, a communication system includes telecommunication network 2310, such as a 3GPP-type cellular network, which comprises access network 2311, such as a radio access network, and core network 2314. Access network 2311 comprises a plurality of base stations 2312a, 2312b, 2312c, such as NBs, eNBs, gNBs or other types of wireless access points, each defining a corresponding coverage area 2313a, 2313b, 2313c. Each base station 2312a, 2312b, 2312c is connectable to core network 2314 over a wired or wireless connection 2315. A first UE 2391 located in coverage area 2313c is configured to wirelessly connect to, or be paged by, the corresponding base station 2312c. A second UE 2392 in coverage area 2313a is wirelessly connectable to the corresponding base station 2312a. While a plurality of UEs 2391, 2392 are illustrated in this example, the disclosed embodiments are equally applicable to a situation where a sole UE is in the coverage area or where a sole UE is connecting to the corresponding base station 2312.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

Figure 24:
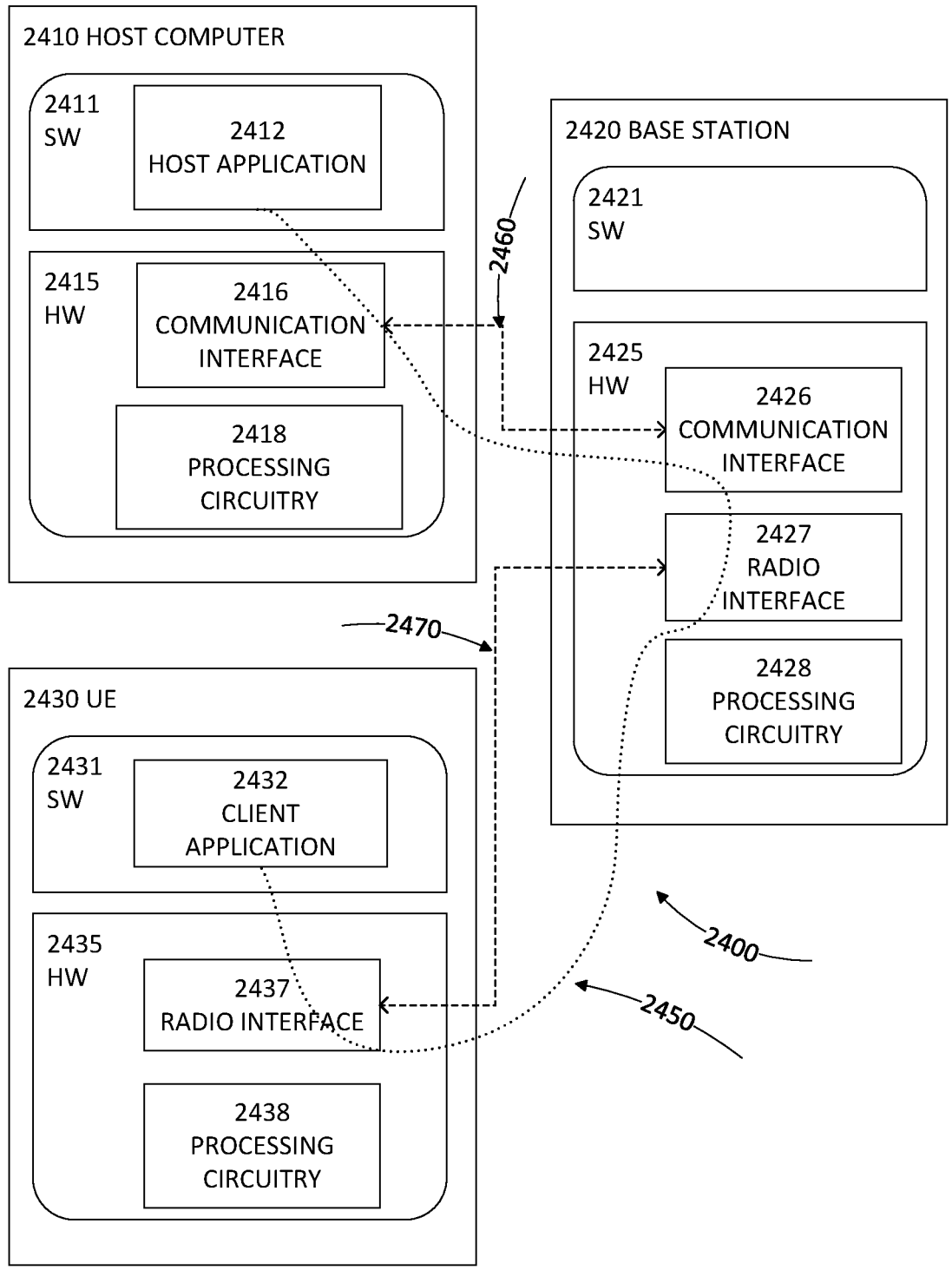
FIG. 24 is a block diagram of a host computer according to some embodiments.

Example implementations, in accordance with an embodiment, of the UE, base station and host computer discussed in the preceding paragraphs will now be described with reference to FIG. 24. FIG. 24 illustrates host computer communicating via a base station with a user equipment over a partially wireless connection in accordance with some embodiments In communication system 2400, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with UE 2430 located in a coverage area (not shown in FIG. 24) served by base station 2420. Communication interface 2426 may be configured to facilitate connection 2460 to host computer 2410. Connection 2460 may be direct or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312*a*, 2312*b*, 2312*c* and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both. In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420. Such procedures and functionalities may be known and practiced in the art. In certain embodiments, measurements may involve proprietary UE signaling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

Figure 25:
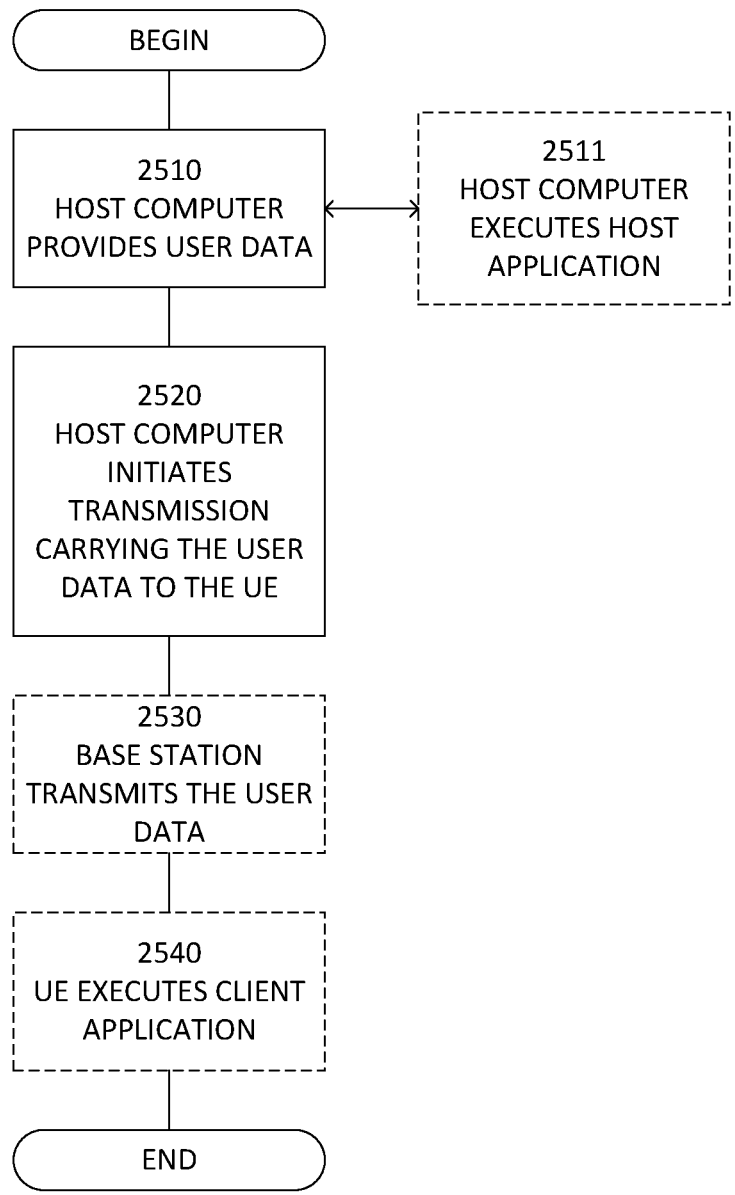
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 2510, the host computer provides user data. In substep 2511 (which may be optional) of step 2510, the host computer provides the user data by executing a host application. In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

Figure 26:
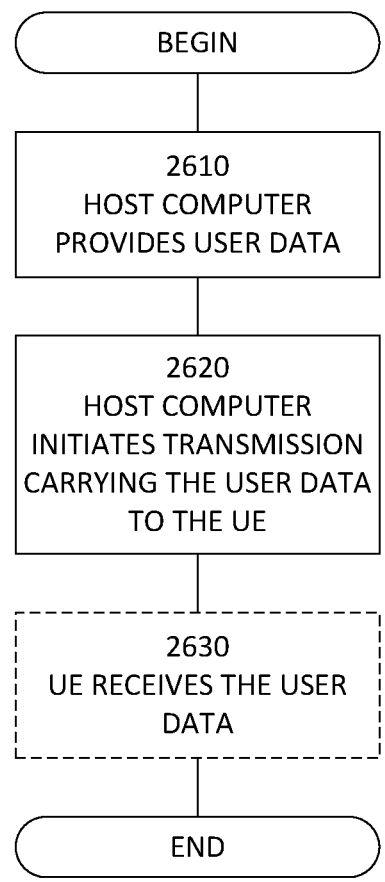
FIG. 26 is a flowchart illustrating a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figure 27:
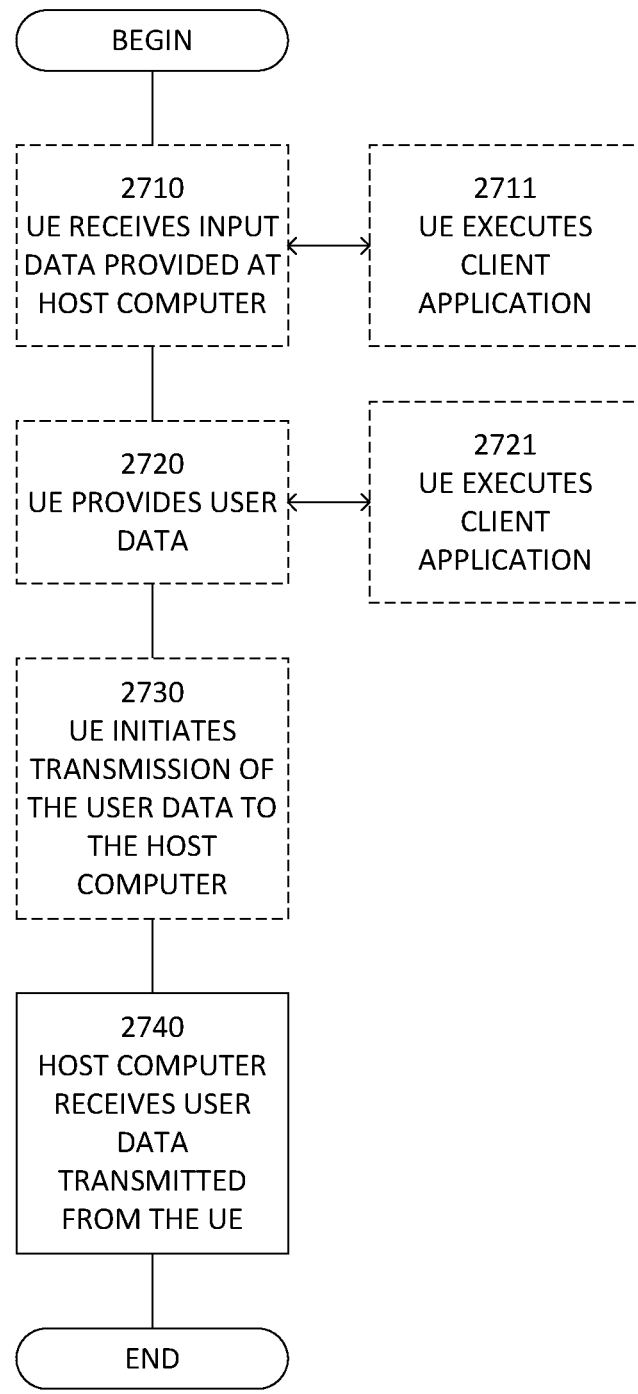
FIG. 27 is a flowchart illustrating a method implemented in a communication system, in accordance with one embodiment.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

Figure 28:
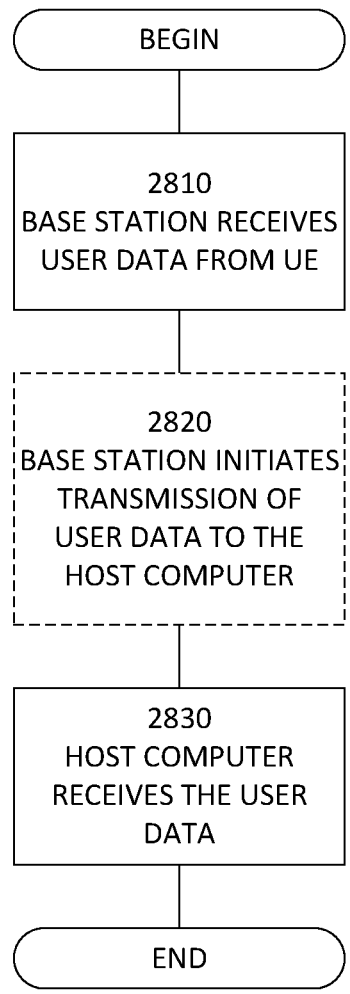
FIG. 28 is a flowchart illustrating a method implemented in a communication system, in accordance with one embodiment.

FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
receiving a control message that indicates a nested conditional configuration, wherein the nested conditional configuration includes:
an outer conditional configuration that the wireless device is to apply if the wireless device detects fulfillment of an outer trigger condition, wherein the outer conditional configuration is to apply to a master radio network node or master cell group in multi-connectivity operation; and
an inner conditional configuration that the wireless device is to apply if the wireless device detects fulfillment of both the outer trigger condition and an inner trigger condition, wherein the inner conditional configuration is to apply to a secondary radio network node or secondary cell group in multi-connectivity operation;
wherein the inner conditional configuration is nested within the outer conditional configuration within the control message.

2. The method of claim 1, wherein the outer conditional configuration is a conditional handover configuration for conditional handover to a master radio network node or master cell group in multi-connectivity operation, and wherein the inner conditional configuration is a conditional secondary configuration for conditionally adding or changing a secondary radio network node or a secondary cell group in multi-connectivity operation.

3. The method of claim 1, wherein the nested conditional configuration is a nested conditional handover configuration.

4. The method of claim 1, further comprising monitoring for or evaluating fulfillment of the inner trigger condition only after detecting that the outer trigger condition has been fulfilled.

5. The method of claim 1, further comprising performing a measurement on which fulfillment of the inner trigger condition depends, only after detecting that the outer trigger condition has been fulfilled.

6. A method performed by a radio network node, the method comprising:
transmitting, to a wireless device, a control message that indicates a nested conditional configuration, wherein the nested conditional configuration includes:
an outer conditional configuration that the wireless device is to apply if the wireless device detects fulfillment of an outer trigger condition, wherein the outer conditional configuration is to apply to a master radio network node or master cell group in multi-connectivity operation; and an inner conditional configuration that the wireless device is to apply if the wireless device detects fulfillment of both the outer trigger condition and an inner trigger condition, wherein the inner conditional configuration is to apply to a secondary radio network node or secondary cell group in multi-connectivity operation;

wherein the inner conditional configuration is nested within the outer conditional configuration within the control message.

7. The method of claim 6, wherein the outer conditional configuration is a conditional handover configuration for conditional handover to a master radio network node or master cell group in multi-connectivity operation, and wherein the inner conditional configuration is a conditional secondary configuration for conditionally adding or changing a secondary radio network node or a secondary cell group in multi-connectivity operation.

8. The method of claim 6, further comprising transmitting, to the wireless device, signalling indicating a time limit for the inner trigger condition to be fulfilled after the outer trigger condition has been fulfilled.

9. The method of claim 6, further comprising receiving a control message that indicates the wireless device applied the outer conditional configuration.

10. The method of claim 9, further comprising, responsive to receiving the control message, transmitting control signaling to one or more other radio network nodes indicating that any other outer conditional configuration for the wireless device is to be released.

11. A wireless device comprising:
communication circuitry; and
processing circuitry configured to receive a control message that indicates a nested conditional configuration, wherein the nested conditional configuration includes:
an outer conditional configuration that the wireless device is to apply if the wireless device detects fulfillment of an outer trigger condition, wherein the outer conditional configuration is to apply to a master radio network node or master cell group in multi-connectivity operation; and
an inner conditional configuration that the wireless device is to apply if the wireless device detects fulfillment of both the outer trigger condition and an inner trigger condition, wherein the inner conditional configuration is to apply to a secondary radio network node or secondary cell group in multi-connectivity operation;
wherein the inner conditional configuration is nested within the outer conditional configuration within the control message.

12. The wireless device of claim 11, wherein the outer conditional configuration is a conditional handover configuration for conditional handover to a master radio network node or master cell group in multi-connectivity operation, and wherein the inner conditional configuration is a conditional secondary configuration for conditionally adding or changing a secondary radio network node or a secondary cell group in multi-connectivity operation.

13. The wireless device of claim 11, wherein the processing circuitry is further configured to monitor for or evaluating fulfillment of the inner trigger condition only after detecting that the outer trigger condition has been fulfilled.

14. The wireless device of claim 11, wherein the processing circuitry is further configured to perform a measurement on which fulfillment of the inner trigger condition depends, only after detecting that the outer trigger condition has been fulfilled.

15. A radio network node comprising:
communication circuitry; and
processing circuitry configured to transmit, to a wireless device, a control message that indicates a nested conditional configuration, wherein the nested conditional configuration includes:
an outer conditional configuration that the wireless device is to apply if the wireless device detects fulfillment of an outer trigger condition, wherein the outer conditional configuration is to apply to a master radio network node or master cell group in multi-connectivity operation; and
an inner conditional configuration that the wireless device is to apply if the wireless device detects fulfillment of both the outer trigger condition and an inner trigger condition, wherein the inner conditional configuration is to apply to a secondary radio network node or secondary cell group in multi-connectivity operation;
wherein the inner conditional configuration is nested within the outer conditional configuration within the control message.

16. The radio network node of claim 15, wherein the outer conditional configuration is a conditional handover configuration for conditional handover to a master radio network node or master cell group in multi-connectivity operation, and wherein the inner conditional configuration is a conditional secondary configuration for conditionally adding or changing a secondary radio network node or a secondary cell group in multi-connectivity operation.

17. The method of claim 2, further comprising:
monitoring for or evaluating fulfillment of the outer trigger condition;
based on said monitoring for or evaluating fulfillment of the outer trigger condition, detecting fulfillment of the outer trigger condition;
only after detecting that the outer trigger condition has been fulfilled, monitoring for or evaluating fulfillment of the inner trigger condition;
based on said monitoring for or evaluating fulfillment of the inner trigger condition, detecting fulfillment of the inner trigger condition; and
based on detecting fulfillment of the outer trigger condition and the inner trigger condition, applying the nested conditional configuration and performing a handover to the master network node according to the conditional handover configuration, while at the same time adding or changing to the secondary radio network node in multi-connectivity operation according to the conditional secondary configuration.

18. The wireless device of claim 12, wherein the processing circuitry is further configured to:
monitor for or evaluate fulfillment of the outer trigger condition;
based on monitoring for or evaluating fulfillment of the outer trigger condition, detect fulfillment of the outer trigger condition;
only after detecting that the outer trigger condition has been fulfilled, monitor for or evaluate fulfillment of the inner trigger condition;

based on monitoring for or evaluating fulfillment of the inner trigger condition, detect fulfillment of the inner trigger condition; and based on detecting fulfillment of the outer trigger condition and the inner trigger condition, apply the nested conditional configuration and perform a handover to the master network node according to the conditional handover configuration, while at the same time adding or changing to the secondary radio network node according to the conditional secondary configuration in multi-connectivity operation with the master network node.

19. The method of claim 1, wherein a field of the control message includes the outer conditional configuration, and wherein a field of the outer conditional configuration includes the inner conditional configuration such that the inner conditional configuration is embedded within the outer conditional configuration.

* * * * *